United States Patent
Endoh et al.

(10) Patent No.: US 11,914,448 B2
(45) Date of Patent: Feb. 27, 2024

(54) CLUSTERING DEVICE AND CLUSTERING METHOD

(71) Applicant: TOHOKU UNIVERSITY, Miyagi (JP)

(72) Inventors: Tetsuo Endoh, Miyagi (JP); Hui Shen, Miyagi (JP); Yitao Ma, Miyagi (JP)

(73) Assignee: TOHOKU UNIVERSITY, Miyagi (JP)

( * ) Notice: Subject to any disclaimer, the term of this patent is extended or adjusted under 35 U.S.C. 154(b) by 197 days.

(21) Appl. No.: 17/423,192

(22) PCT Filed: Feb. 6, 2019

(86) PCT No.: PCT/JP2019/004315
§ 371 (c)(1),
(2) Date: Jul. 15, 2021

(87) PCT Pub. No.: WO2020/161845
PCT Pub. Date: Aug. 13, 2020

(65) Prior Publication Data
US 2022/0066533 A1 Mar. 3, 2022

(51) Int. Cl.
*G06F 1/26* (2006.01)
*G06F 1/32* (2019.01)
(Continued)

(52) U.S. Cl.
CPC .......... *G06F 1/3275* (2013.01); *G06F 18/217* (2023.01); *G06F 18/23* (2023.01)

(58) Field of Classification Search
CPC ...... G06F 1/3275; G06F 18/217; G06F 18/23; G06F 18/23211; G06F 16/00;
(Continued)

(56) References Cited

U.S. PATENT DOCUMENTS

2008/0058668 A1* 3/2008 Seyed Momen ......... A61F 2/72
  600/546
2012/0303623 A1 11/2012 Punera et al.

FOREIGN PATENT DOCUMENTS

JP H05205058 A 8/1993
JP H11219374 A 8/1999

OTHER PUBLICATIONS

Sako Yutaka, English Translation of JPH05205058, 1993 (Year: 1993).*

(Continued)

*Primary Examiner* — Xuxing Chen
(74) *Attorney, Agent, or Firm* — Fox Rothschild LLP; Carol Thorstad-Forsyth

(57) ABSTRACT

A clustering device includes: an evaluation score calculation section configured to calculate an evaluation score or evaluation scores for evaluating a classification result; a batch process section configured to classify multiple element data into clusters with an optimum number of clusters, based on the evaluation scores respectively obtained for different number of clusters by assigning each of the multiple element data to one of the clusters; an update process section configured to assign newly added element data to a cluster that is closest to the newly added element data among the clusters into which the multiple element data are classified by the batch process section; and a determination section configured to determine validity of a classification result after assigning the newly added element data to the cluster, based on the evaluation score obtained by assigning the newly added element data to the cluster by the update process section.

18 Claims, 17 Drawing Sheets

(51) Int. Cl.
*G06F 1/3234* (2019.01)
*G06F 18/23* (2023.01)
*G06F 18/21* (2023.01)

(58) Field of Classification Search
CPC .. G06F 16/906; G06F 16/285; G06F 18/2321; Y02D 10/00
See application file for complete search history.

(56) References Cited

OTHER PUBLICATIONS

Z. Hou et.al., "Real-Time Very Large-Scale Integration Recognition System with an On-Chip Adaptive K-Means Learning Algorithm", JJAP, vol. 52, 04CE11.
Chen, Tse-Wei, and Makoto Ikeda. "Design and implementation of low-power hardware architecture with single-cycle divider for on-line clustering algorithm." IEEE Transactions on Circuits and Systems I: Regular Papers 60.8 (2013): 2165-2176.
Arbelaitz, O. et al. "An extensive comparative study of cluster validity indices." Pattern Recognit. 46 (2013): 243-256.
Saitta, S. et al. "A comprehensive validity index for clustering." Intell. Data Anal. 12 (2008): 529-548.
International Search Report issued in PCT/JP2019/004315 dated Mar. 12, 2019.

\* cited by examiner

FIG. 16
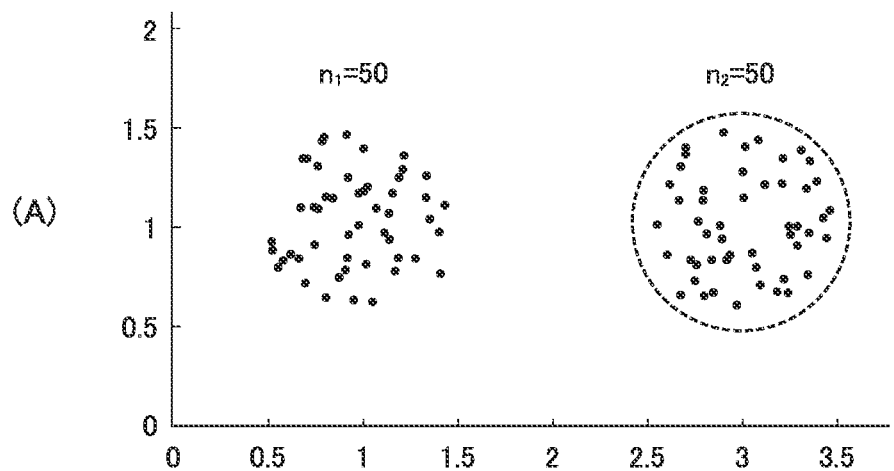
(A)
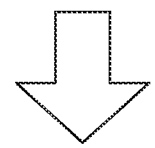
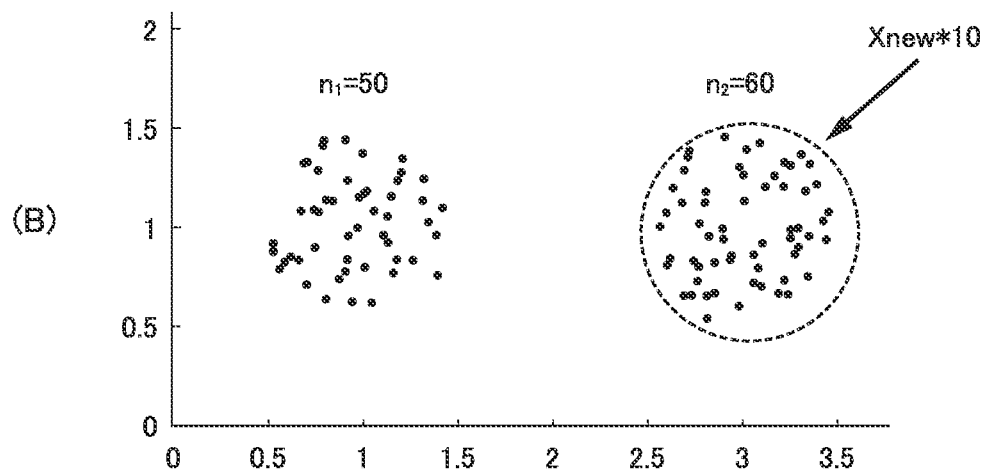
(B)

FIG. 17
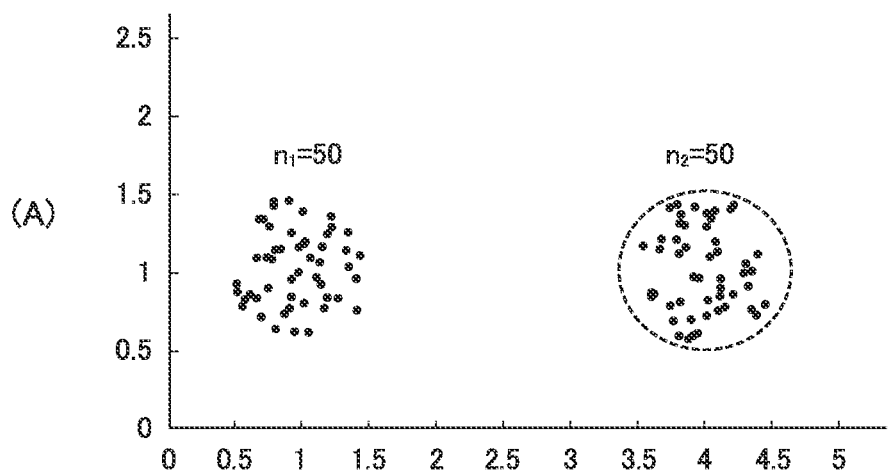
(A)
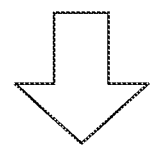
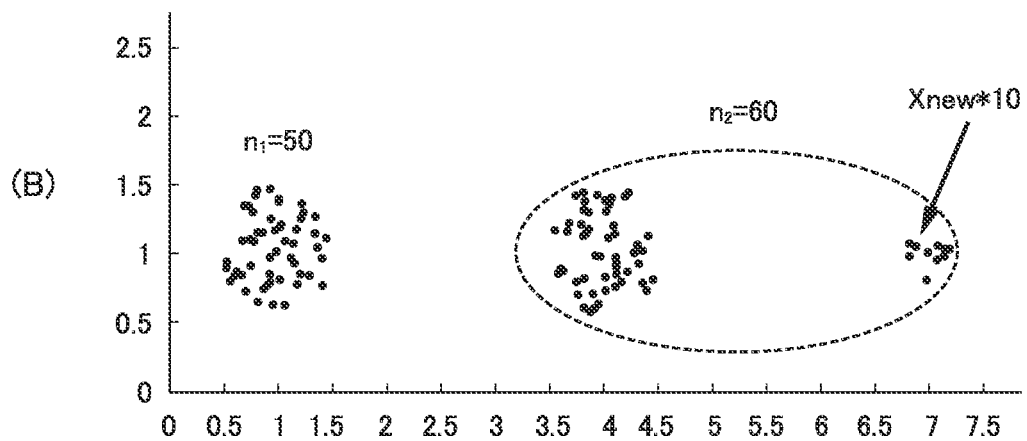
(B)

FIG. 18
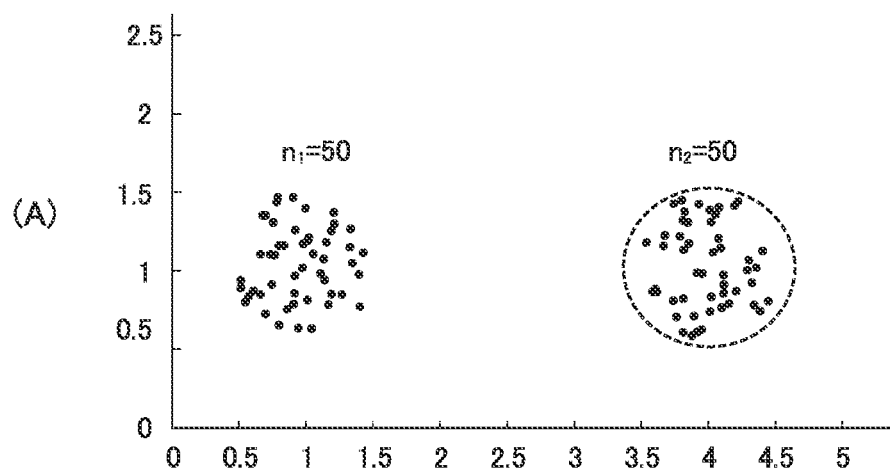
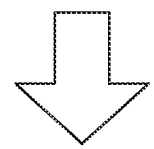
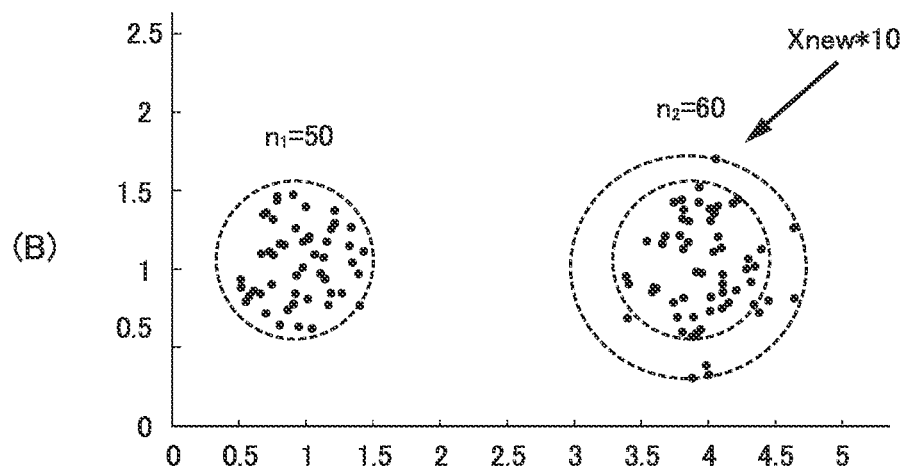

CLUSTERING DEVICE AND CLUSTERING METHOD

CROSS REFERENCE TO RELATED APPLICATIONS

This application is a U.S. National Stage entry under 35 U.S.C. § 371 based on International Application No. PCT/JP2019/004315, filed on Feb. 6, 2019. The contents of which are incorporated herein by reference in its entirety.

TECHNICAL FIELD

The present invention relates to a clustering device and a clustering method.

BACKGROUND ART

Clustering (cluster analysis) for classifying a set of multiple element data into multiple clusters (data groups) has been known, and recently has often been used for image analysis, data mining, big data analysis, and the like. In machine learning, such clustering is recognized as unsupervised learning. In clustering, similar element data are assigned to the same cluster so that element data in different clusters are as dissimilar as possible, and tendencies or characteristics of element data are extracted based on the classification result.

There are various known clustering algorithms for classifying multiple element data into clusters, and a representative one of such known clustering algorithms is k-means clustering algorithm. In the k-means clustering algorithm, the number of clusters k is set in advance, k element data are arbitrarily selected from all of N element data, for example, and the selected element data are set as initial centroids of the k clusters (Step 1). Next, cluster classification is carried out by finding, for each element data, a centroid among the centroids of the k clusters, which yields a minimum distance between the centroid and element data (Step 2). For each cluster, an average of element data within each cluster is set as a new centroid of each cluster (Step 3). Steps 2 and 3 are repeated until the centroid of each cluster is no longer changed.

The clustering algorithms described above are for classifying element data into a preset number of clusters, and therefore the number of clusters needs to be set in advance. Typically, in order to determine an optimum number of clusters, the clustering is repeated by changing the number of clusters to obtain an evaluation score for each clustering result. Then, the number of clusters corresponding to the extreme, the maximum, or the minimum evaluation score is determined as the optimum number of clusters.

There is a known clustering algorithm for determining, upon addition of new element data, an optimum number of clusters as described above using all the element data including the new element data, and performing clustering with the optimum number of clusters (see Non-Patent Literature 1). Another known clustering algorithm is to identify, upon addition of new element data, a cluster centroid which yields the minimum distance to the new element data, and assign the new element data to the cluster having the identified cluster centroid (see Non-Patent Literature 2).

CITATION LIST

Non-Patent Literature

Non-Patent Literature 1: Z. Hou et. al., "Real-Time Very Large-Scale Integration Recognition System with an On-Chip Adaptive K-Means Learning Algorithm", JJAP, Vol. 52, 04CE11

Non-Patent Literature 2: Chen, Tse-Wei, and Makoto Ikeda. "Design and implementation of low-power hardware architecture with single-cycle divider for on-line clustering algorithm." IEEE Transactions on Circuits and Systems I: Regular Papers 60.8 (2013): 2165-2176.

SUMMARY OF INVENTION

Technical Problem

As to the clustering algorithm for determining, upon addition of new element data, an optimum number of clusters using all the element data including the new element data and performing clustering with the optimum number of clusters, such an algorithm holds promise of highly accurate classification result, but is not efficient due to its heavy computation load. Besides, the algorithm is not suitable for purposes that require high-speed response of the clustering result. In contrast, by employing the clustering algorithm for assigning, upon addition of new element data, the new element data to the cluster having a cluster centroid which yields the minimum distance to the new element data, high-speed response of the clustering result can be obtained, but the accuracy of the classification result might be low. This is because the number of clusters before the addition of the new element data is deemed to be appropriate even after the addition of the new element data.

The present invention has been made in view of the foregoing, and an object of the invention is to provide a clustering device and a clustering method for performing highly efficient and accurate clustering.

Solution to Problem

A clustering device according to the invention is a clustering device for classifying multiple element data, and includes: a data storage section configured to store the multiple element data; an evaluation score calculation section configured to calculate an evaluation score or evaluation scores for evaluating a classification result; a batch process section configured to classify the multiple element data into clusters with an optimum number of clusters, based on the evaluation scores respectively obtained for different number of clusters by assigning each of the multiple element data to one of the clusters; an update process section configured to assign newly added element data to a cluster that is closest to the newly added element data among the clusters into which the multiple element data are classified by the batch process section; and a determination section configured to determine validity of a classification result after assigning the newly added element data to the cluster, based on the evaluation score obtained by assigning the newly added element data to the cluster by the update process section.

A clustering device according to the invention includes: a clustering section configured to classify multiple element data into clusters; and an evaluation score calculation section configured to: using calculated values obtained during a calculation process by the clustering section for classification of the multiple element data, calculate a degree of internal compactness that is a first sum of values, each being defined by normalizing a first index value by a first value that is based on a number of element data within each cluster, the first index value indicating a degree of dispersion of element data within each cluster; calculate a degree of external separation defined by normalizing a second sum of second index values for each cluster by a second value that is based on a number of clusters, each of the second index values indicating an index of a distance between the clusters; and calculate an evaluation score for evaluating a classification result by the clustering section according to a predetermined formula defined by the degree of internal compactness and the degree of external separation which are variables.

A clustering method according to the invention includes: a batch process step of obtaining an optimum number of clusters from evaluation scores obtained by classifying all element data into clusters while changing a number of clusters to evaluate classification results for each of the number of clusters, and obtaining a classification result of classifying all element data into clusters with the optimum number of clusters; an update process step of assigning, upon addition of new element data after the batch process step, the new element data to one of existing clusters, and calculating an evaluation score for evaluating a classification result after assigning the new element data to the one of the existing clusters; and a determining step of determining validity of the classification result in the update process step, based on the evaluation score calculated in the update process step.

Advantageous Effects of Invention

According to the present invention, an optimum number of clusters is obtained using all element data, and all element data are classified into clusters with an optimum number of clusters, and thereafter, upon addition of new element data, the new element data is assigned to one of the existing clusters that is closest to the new element data, and validity of a classification result is determined based on an evaluation score obtained after assignment of the new element data. Thus, it is possible to perform highly efficient and accurate clustering.

In addition, according to the present invention, using calculated values obtained during a calculation process by a clustering section for classification of multiple element data, an evaluation score is calculated based on a degree of internal compactness and a degree of external separation. The degree of internal compactness indicates a degree of dispersion of element data within each cluster, and the degree of external separation indicates a degree of separation between the clusters. Thus, it is possible to obtain a highly accurate evaluation score efficiently while reducing excessive classification, thereby performing highly efficient and accurate clustering.

BRIEF DESCRIPTION OF DRAWINGS

FIG. 16 is an explanatory diagram illustrating an example of validation before and after the update process.

FIG. 17 is an explanatory diagram illustrating another example of validation before and after the update process.

FIG. 18 is an explanatory diagram illustrating still another example of validation before and after the update process.

DESCRIPTION OF EMBODIMENTS

Figure 1:
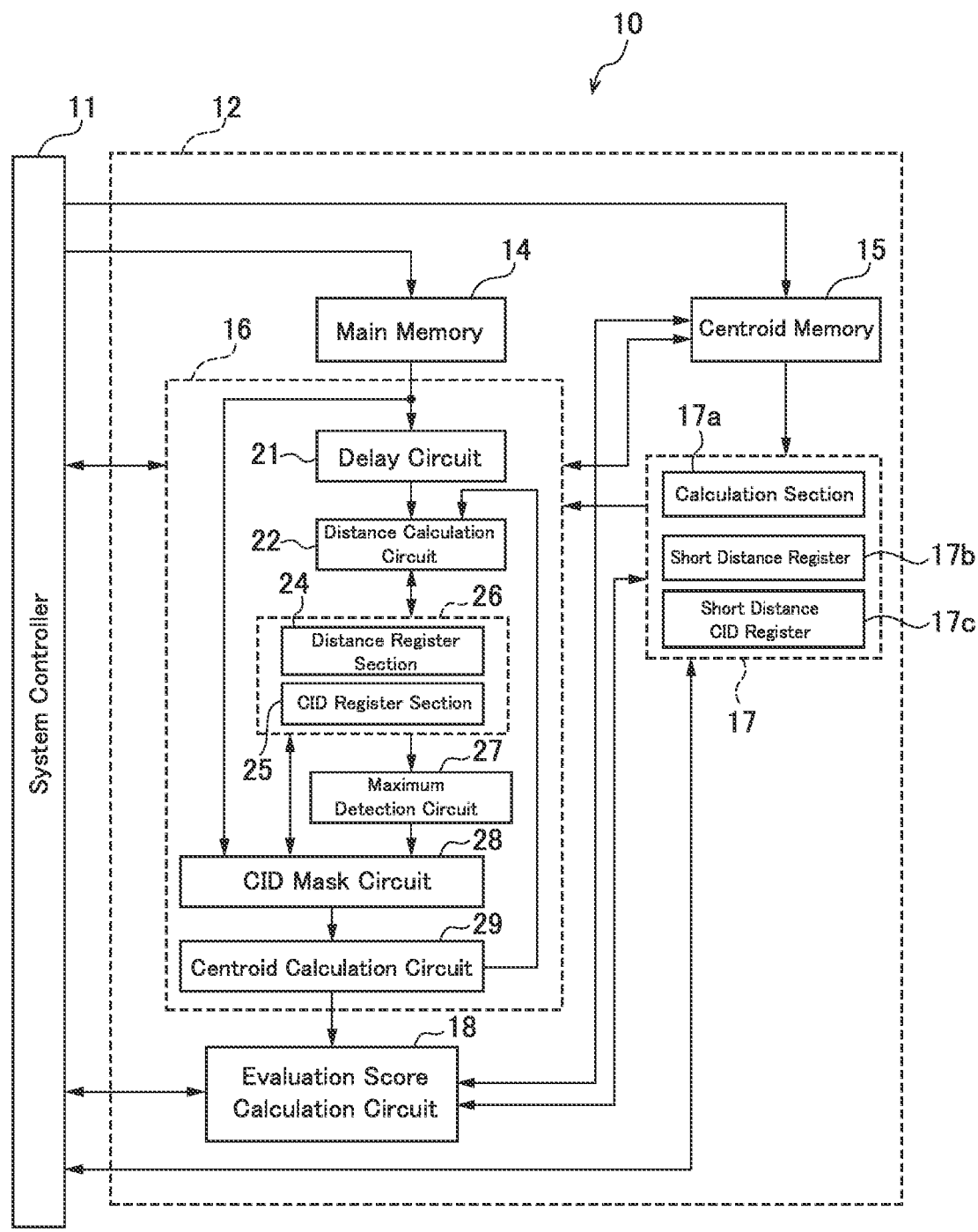
FIG. 1 is a block diagram illustrating a configuration of a clustering device according to embodiments of the present invention.

In FIG. 1, a clustering device 10 is configured to cluster multiple element data. The clustering device 10 performs a batch process and an update process (online process).

The batch process is a process of: obtaining an optimum number of clusters from evaluation scores for each of the number of clusters, the evaluation scores being obtained by classifying all element data into clusters while changing the number of clusters; and obtaining a clustering result (classification result) by classifying all element data into clusters with the optimum number of clusters. In the embodiments, the k-means algorithm is used as a clustering algorithm in the batch process, and the number of clusters corresponding to the maximum (or local maximum) evaluation score is determined as the optimum number of clusters.

The update process is a process of, upon addition of new element data after the batch process, assigning the newly added element data to an existing cluster efficiently at high speed. In this update process, an evaluation score is obtained after assignment of the newly added element data to the cluster, and validity of the update process is determined using this evaluation score. The evaluation score obtained in the update process is equivalent to each of the evaluation scores obtained in the batch process. The validity determination is made as to whether the clustering result in the update process is valid. If the clustering result is valid, the result in the update process is set as a final result. If the clustering result is not valid, the batch process is executed.

An evaluation score for the number of clusters Nc obtained in the batch process and the update process is denoted by E(Nc). The evaluation score E(Nc) in the embodiments is defined as Formula (1) where i takes values 1, 2, . . . Nc and indicates a cluster ID in the embodiments.

[Formula 1]

$$E(Nc) = \frac{SBS/Nc}{SWD} \quad (1)$$

where $SWD = \sum_{i=1}^{Nc} \left( \frac{1}{n_i} \sum_{X \in C_i} d(X, V_i) \right)$ -continued $$SBS = \sum_{i=1}^{Nc}(n_i \cdot d(V_i, GG))$$

The notation in Formula (1) is listed below:
SWD: Degree of internal compactness (normalized) which is a first sum;
SBS/Nc: Degree of external separation (normalized);
SBS: Second sum;
X: Element data;
GG: Data gravity center which is a global gravity center of all element data;
$C_i$: Cluster with a cluster ID of "i";
$V_i$: Cluster centroid which is a gravity center of a cluster $C_i$;
$n_i$: The number of element data within the cluster $C_i$;
$d(V_i, GG)$: Global-gravity-to-centroid distance which is a distance between the cluster centroid $V_i$ and the data gravity center GG; and
$d(X, V_i)$: Data-to-centroid distance which is a distance between the element data X and the cluster centroid $V_i$.

In the following description, the global-gravity-to-centroid distance $d(V_i, GG)$ is referred to as a global-gravity-to-centroid distance $DGV_i$, and the data-to-centroid distance $d(X, V_i)$ is referred to as a data-to-centroid distance $DXV_i$. The data-to-centroid distance $DXV_i$ is sometimes referred to as a within-cluster distance $DXV_i$ to specifically identify a distance between the element data X within the cluster $C_i$ and the cluster centroid $V_i$ of the cluster $C_i$. In order to specifically identify individual element data X, the element data are denoted by $X_1, X_2, \ldots$, for example.

The element data X is a q-dimensional vector (where q is an integer equal to or more than 1), and represents feature amounts such as an image's color, gray scale, and color distribution. Each dimension of the element data X is represented by N bits (e.g., 8 bits). The data gravity center GG is calculated as an arithmetic mean of all the element data X, and the cluster centroid $V_i$ is calculated as an arithmetic mean of the element data X within each cluster. Each of the data gravity center GG and the cluster centroid $V_i$ is a q-dimensional vector as with the element data X. In the embodiments, the global-gravity-to-centroid distance $DGV_i$ and the data-to-centroid distance $DXV_i$ are calculated as Manhattan distance.

The value SWD at the denominator on the right-hand side of Formula (1) represents a degree of internal compactness indicating, for all the clusters, a degree of dispersion of element data X (similarity between the element data) within each cluster $C_i$. The degree of internal compactness in Formula (1) is calculated as a first sum which is the sum of compactness index values $SWD_i$ for the respective clusters $C_i$, each compactness index value being obtained by normalizing a first index value $SD_i$ for each cluster $C_i$ by dividing the first index value by the number of data points $n_i$ within the cluster. The first index value $SD_i$ is defined as the sum of the within-cluster distances $DXV_i$ for the element data X within each cluster $C_i$.

The numerator on the right-hand side of Formula (1) represents a degree of external separation indicating, for all the clusters, a degree of separation between the clusters $C_i$. The degree of external separation in Formula (1) is obtained by normalizing a cluster index value SBS by dividing the cluster index value by the number of clusters Nc. The cluster index value SBS in the embodiments is calculated as a second sum which is the sum of second index values $SBS_i$ for the respective clusters $C_i$, each second index value being an index of a distance between the clusters. The second index value $SBS_i$ is defined as the global-gravity-to-centroid distance $DGV_i$ weighted by the number of data points $n_i$ within the cluster $C_i$. Using the global-gravity-to-centroid distance $DGV_i$ as the second index value $SBS_i$ has an advantage over using a between-cluster distance in terms of reducing the amount of calculation. The weighting coefficient by which the global-gravity-to-centroid distance $DGV_i$ is multiplied is not limited to the number of data points $n_i$. Alternatively, the weighting coefficient may be a value determined based on the number of data points $n_i$.

The degree of internal compactness SWD is represented as Formula (2) using the compactness index values $SWD_i$, and the cluster index value SBS is represented as Formula (3) using the second index values $SBS_i$. The compactness index value $SWD_i$ and the second index value $SBS_i$ for the cluster $C_i$ are represented as Formulae (4) and (5), respectively.

[Formula 2]

$$SWD = SWD_1 + SWD_2 + \ldots \quad (2)$$

$$SBS = SBS_1 + SBS_2 + \ldots \quad (3)$$

$$SWD_i = \frac{1}{n_i} \cdot SD_i = \frac{1}{n_i} \cdot \sum x \in c_i d(X, V_i) \quad (4)$$

$$SBS_i = n_i \cdot d(V_i, GG) \quad (5)$$

As described above, in the evaluation score E(Nc), the degree of external separation is defined by normalizing the cluster index value SBS by the number of clusters Nc, and the degree of internal compactness is defined as the first sum of the compactness index values $SWD_i$, each of which is obtained by normalization by the number of data points $n_i$ within each cluster $C_i$. With such a definition, even if there is a larger-area group of element data X or a higher-density group of element data X than any other groups in all element data, the degree of dispersion of the element data X within each cluster $C_i$ is appropriately reflected in the degree of internal compactness. In other words, excessive classification does not lead to a higher evaluation score E(Nc), thereby suppressing the excessive classification.

The clustering device 10 includes a system controller 11 and a computation unit 12. The computation unit 12 includes a main memory 14, a centroid memory 15, a clustering computation section 16, a neighbor search circuit section 17, and an evaluation score calculation circuit 18.

The system controller 11 is configured to input element data X into the computation unit 12, give instructions to execute clustering in the batch process and to execute the update process, set the number of clusters Nc, determine the optimum number of clusters Nc based on the evaluation score E(Nc) acquired from the computation unit 12, determine the validity described above, control power gating over the computation unit 12, and perform other operations. The power gating will be described later. Moreover, the system controller 11 is configured to acquire a cluster ID which is allocated to each element data X by the computation unit 12 as a clustering result, and a cluster ID of a cluster $C_i$ to which newly added element data Xnew is assigned. In the embodiments, the system controller 11 functions as a determination section.

The system controller 11 is further configured to monitor the data contents of the centroid memory 15, i.e., monitor each cluster centroid $V_i$ when the computation unit 12 executes clustering, and terminate the clustering when each cluster centroid $V_i$ is no longer changed, that is, when each cluster centroid $V_i$ converges. Instead of convergence of the cluster centroid $V_i$, the system controller 11 may terminate the clustering after a preset number of classification calculations is over. The classification calculations will be described later.

The system controller 11 is configured to store reconstruction data for each of the number of clusters Nc at the time of the batch process. The reconstruction data is data for reconstructing the cluster ID, the within-cluster distance $DXV_i$, the cluster centroid $V_i$, the number of data points $n_i$, and the like, which are held in the computation unit 12, in a state where element data are clustered into clusters with the optimum number of clusters Nc. In the embodiments, the system controller 11 stores, as the reconstruction data, the cluster ID allocated to each element data X. Instead, each cluster centroid $V_i$, or a combination of the cluster ID and the cluster centroid $V_i$ may be employed as the reconstruction data.

Data held in the computation unit 12 can be reconstructed merely by re-executing clustering with the optimum number of clusters Nc; however, using the cluster ID and/or the cluster centroid Vi makes it possible to perform high-speed reconstruction with a small amount of calculation. In clustering by an algorithm such as the k-means algorithm, most of the computation time needed for the clustering is used for the time of iterative calculation for converging the cluster centroid. The number of iterations of calculation depends on a total number of element data X, and is around several tens to several hundreds of times, and sometimes reaches 1000 times. However, by using the cluster centroid $V_i$ having converged once and/or the cluster ID determined by this convergence in the above manner, it is possible to cluster data at high speed (in a short period of time) and high accuracy without iterative calculation.

The computation unit 12 is designed as an Application Specific Integrated Circuit (ASIC) that executes the batch process and the update process described above, and the sections of the computation unit 12 are configured to operate in synchronization with each other based on a clock from a clock generator (not illustrated). The computation unit 12 is activated in accordance with instructions as a trigger from the system controller 11 to execute clustering in the batch process and to execute the update process.

The clustering computation section 16 is a circuit that executes clustering by the k-means algorithm, and is configured to perform various calculations of clustering in the batch process and perform classification of element data X into clusters $C_i$. The clustering computation section 16 includes: a delay circuit 21; a distance calculation circuit 22; a main register unit 26 including a distance register section 24 and a cluster ID (CID) register section 25; a maximum detection circuit 27; a cluster ID (CID) mask circuit 28; and a centroid calculation circuit 29. The clustering computation section 16 and the system controller 11 constitute a batch process section.

Figure 2:
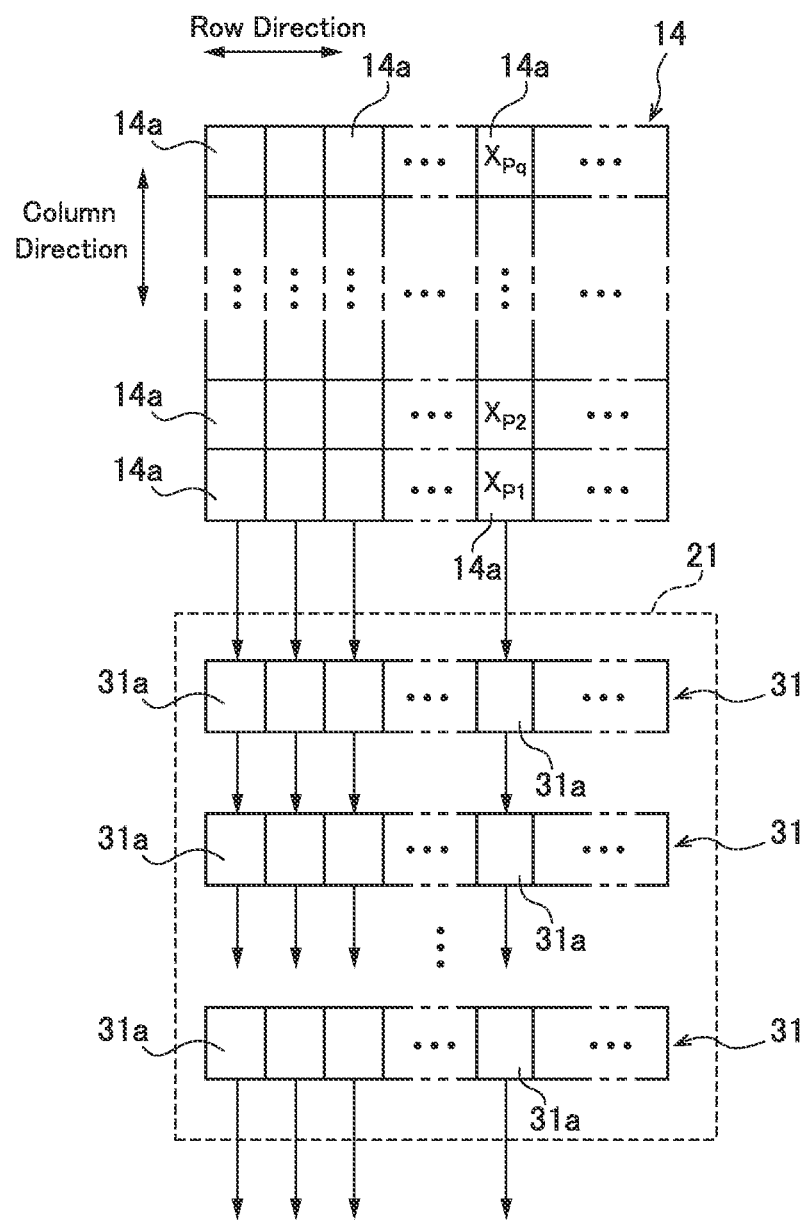
FIG. 2 is an explanatory diagram illustrating the configuration of a main memory and a delay circuit.

The main memory 14 as a data storage section is configured to store multiple element data X that are written by the system controller 11. As one example shown in FIG. 2, the main memory 14 has unit blocks 14a arranged in a q×M matrix, each unit block 14a having N-bit capacity which is the same as that of the component of each dimension of one element data X (hereinafter referred to as a vector component), and q unit blocks 14a, the number of which is the same as that of the dimensions of the element data X, are arranged in each column. The number M of unit blocks 14a arranged in a row direction is equal to or larger than the maximum number of element data X to be classified. The main memory 14 stores the element data X in such a way that one vector component is stored in a single unit block 14a and one element data X is stored in the unit blocks 14a in the same column. FIG. 2 shows that vector components $Xp1, Xp2, \ldots, Xpq$ of element data Xp are written into the main memory 14.

The main memory 14 reads the element data X sequentially with respect to each M unit blocks 14a arranged in a row direction. Therefore, the vector components of the element data X are output from the main memory 14 one dimension at a time in parallel. Reading from a column with no written element data is also performed, and in this case, a component vector of "0" is read, for example. The main memory 14 may write the element data X a small amount at a time, such as per unit block 14a. The same goes for the centroid memory 15.

The centroid memory 15 is configured to store a cluster centroid $V_i$ of each cluster and, although not illustrated, has the same configuration as the main memory 14. Specifically, the centroid memory 15 has N-bit unit blocks arranged in a matrix in which q unit blocks are arranged in a column direction, and is configured to store a q-dimensional cluster centroid $V_i$ in each column. The centroid memory 15 has a smaller capacity than the main memory 14. Reading from the centroid memory 15 is performed for each cluster centroid $V_i$. For one cluster centroid $V_i$, vector components in one column are read sequentially.

In the embodiments, a non-volatile memory is used as the main memory 14 and the centroid memory 15. With this structure, it is possible to stop power supply to the main memory 14 and the centroid memory 15 when the element data X and the cluster centroid $V_i$ are neither read nor written, thus facilitating power saving. As the non-volatile memory used for the main memory 14 and the centroid memory 15, a non-volatile memory including an MTJ element or the like as a storage element is preferably employed.

The delay circuit 21 is provided between the main memory 14 and the distance calculation circuit 22. The delay circuit 21 is configured to synchronize the time when the element data X read from the main memory 14 is input into the distance calculation circuit 22 with the time when the cluster centroid $V_i$ calculated from the element data X by the centroid calculation circuit 29 is input into the distance calculation circuit 22. As shown in FIG. 2, the delay circuit 21 includes register sections 31 that are connected in multiple stages. Each register section 31 includes M cells 31a. Each cell 31a is a register having N-bit capacity. Vector components are transmitted sequentially from the cells 31a of one register section 31 to the cells 31a of the neighboring register section 31, thereby delaying input of the element data X into the distance calculation circuit 22. The delay time of the delay circuit 21, that is, the number of stages of the register sections 31 is determined in advance based on information such as the number of clocks required for calculation of the data gravity center GG and the cluster centroid $V_i$.

In the batch process, the element data X sets from the main memory 14 are input into the distance calculation circuit 22 via the delay circuit 21, and the cluster centroids $V_i$ calculated by the centroid calculation circuit 29 are input into the distance calculation circuit 22. In the update process, the cluster centroids $V_i$ from the centroid memory 15, instead of the centroid calculation circuit 29, are input into the distance calculation circuit 22. The distance calculation circuit 22 is configured to calculate, in parallel, the data-tocentroid distances $DXV_i$ for the respective input element data X sets. Inputting vector data such as the element data X and the cluster centroid $V_i$ into circuits indicates inputting vector components sequentially.

The distance register section 24 is configured to hold each data-to-centroid distance $DXV_i$ calculated by the distance calculation circuit 22, and the CID register section 25 is configured to hold the cluster ID (clustering information). When new data-to-centroid distance $DXV_i$ calculated by the distance calculation circuit 22 is smaller than the data-to-centroid distance $DXV_i$ held in the distance register section 24 at the time, the data content in the distance register section 24 is updated with the new data-to-centroid distance $DXV_i$. In clustering, the cluster IDs held finally in the CID register section 25 indicate clusters into which the element data are classified, and the data-to-centroid distance $DXV_i$ held in the distance register section 24 indicates the within-cluster distance.

Figure 3:
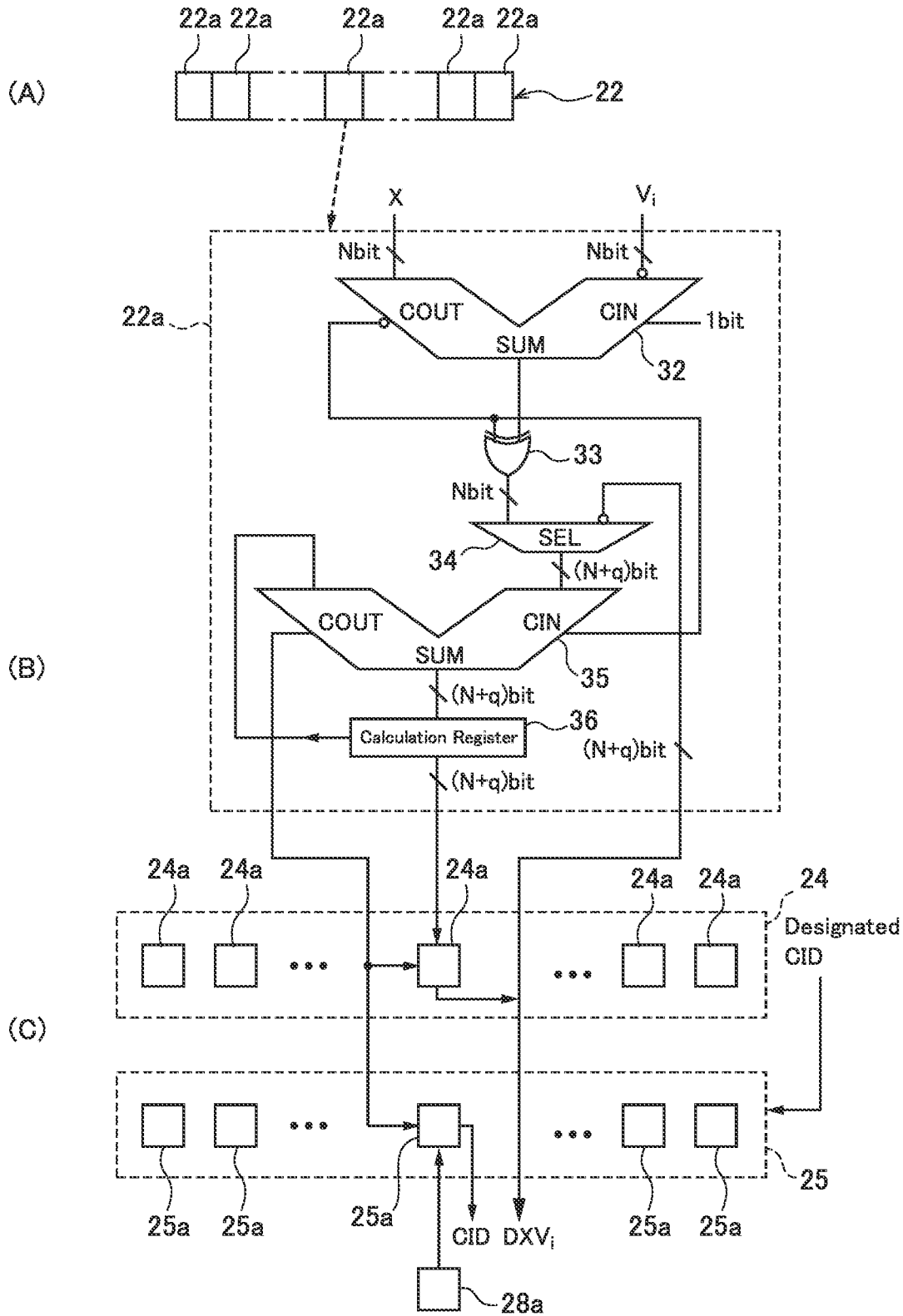
FIG. 3 is a circuit diagram illustrating the configuration of each cell of a distance calculation circuit.
Figure 4:
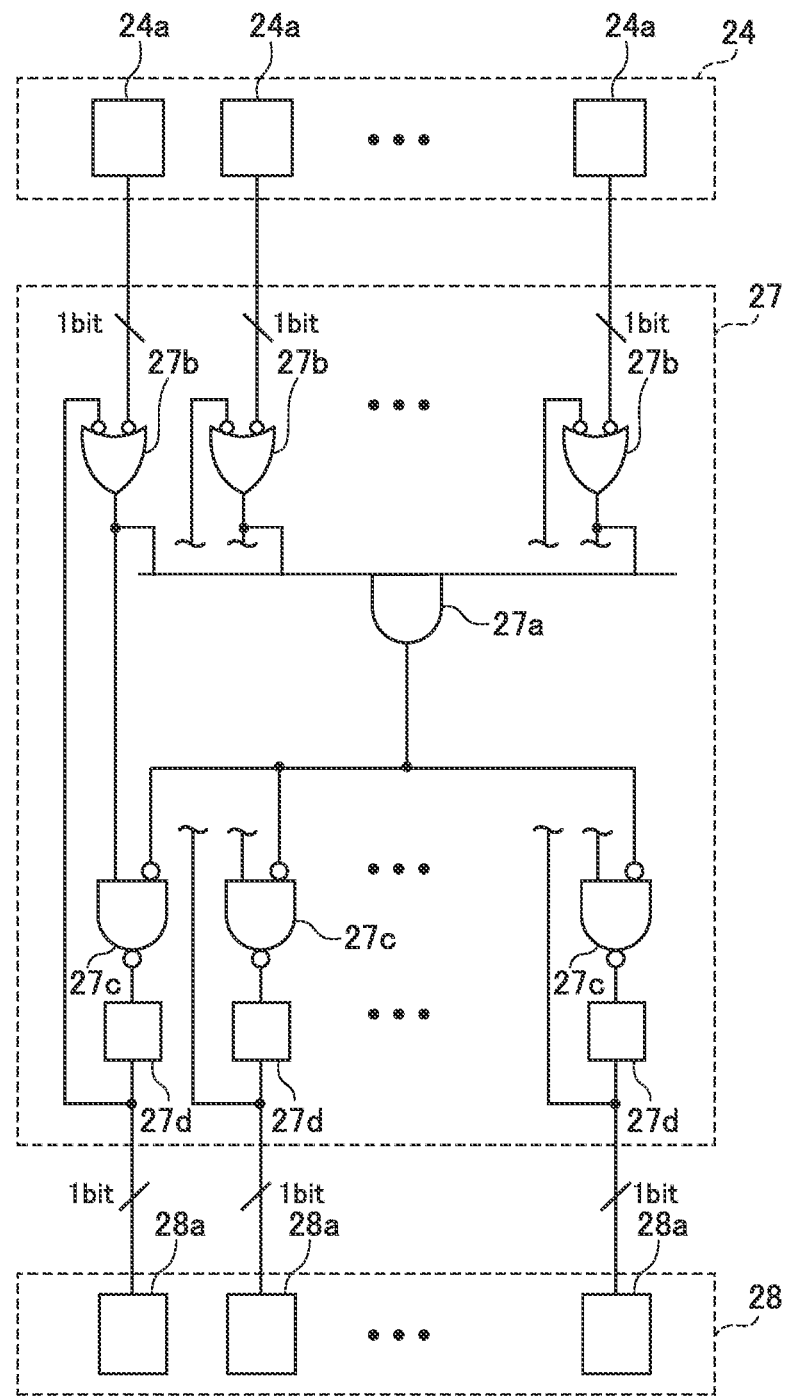
FIG. 4 is a circuit diagram illustrating the configuration of a maximum detection circuit.

As shown in Part (A) of FIG. 3, the distance calculation circuit 22 has M cells 22a for calculating the data-to-centroid distance $DXV_i$. Likewise, as shown in Part (C) of FIG. 3, the distance register section 24 has M cells 24a for holding the data-to-centroid distances $DXV_i$, and the CID register section 25 has M cells 25a for holding the cluster IDs. Each of the cells 24a and 25a is a register having multiple-bit capacity. As described above, when the element data X is a q-dimensional vector and each dimension is represented by N bits, the data-to-centroid distance $DXV_i$ is (N+q)-bit data, and thus each cell 24a has at least (N+q)-bit capacity. A set of one cell 22a, one cell 24a, and one cell 25a is associated with each column of the main memory 14. The same goes for cells 28a of the CID mask circuit 28 which will be described later (see FIG. 5). Therefore, each element data X stored in the main memory 14 is associated with a set of one cell 22a, one cell 24a, one cell 25a, and one cell 28a, and the data contents of these element data X and cells 22a, 24a, 25a, and 28a are associated with each other. In FIG. 3 and FIGS. 4 to 7 to be described later, only the configuration of main parts and signals are shown.

As one example shown in Part (B) of FIG. 3, each cell 22a of the distance calculation circuit 22 includes a full adder 32, an exclusive OR (XOR) circuit 33, a selector 34, a full adder 35, and a calculation register 36. The full adder 32 has a first input terminal receiving the element data X from the delay circuit 21, and a second input terminal receiving an inversion signal of the cluster centroid $V_i$ from the centroid calculation circuit 29 or the centroid memory 15, and outputs the addition result and carry signal (negative logic) to the XOR circuit 33. Accordingly, the distance between the element data X and the cluster centroid $V_i$ for each dimension is sequentially output from the XOR circuit 33.

The distance for each dimension from the XOR circuit 33 is sequentially input into a first input terminal of the full adder 35 via the selector 34. Every time the distance for one dimension from the XOR circuit 33 is input into the full adder 35, in synchronization with this input of the distance, the data contents of the calculation register 36 are read and input into a second input terminal of the full adder 35. Then, the calculation result is obtained by the full adder 35, and the data contents of the calculation register 36 are updated with the calculation result of the full adder 35. The initial value in the calculation register 36 is "0". Through the input of the distance for each of q dimensions into the full adder 35, the data-to-centroid distance (Manhattan distance) $DXV_i$ is held in the calculation register 36.

After the calculation register 36 stores the data-to-centroid distance as described above, that is, after the data-to-centroid distance $DXV_i$ is calculated, the selector 34 outputs an inversion signal of the data contents of each cell 24a to the first input terminal of the full adder 35. Then, the data contents of the calculation register 36 and the data contents of the cell 24a are read in synchronization with each other and input into the full adder 35. The cell 24a receives the data contents of the calculation register 36 as input data, and receives a carry signal of the full adder 35 as an update signal. Therefore, when a carry occurs in the full adder 35, the data contents of the cell 24a are updated with the data contents of the calculation register 36. By repeating such operations for each cluster centroid $V_i$ that is input into the distance calculation circuit 22, the minimum value of the data-to-centroid distances $DXV_i$ for the respective cluster centroids $V_i$ is held in the cell 24a. Since the data contents of the cells 24a are updated independently, the data-to-centroid distances $DXV_i$ for each of the element data X are held in the distance register section 24.

When the distance calculation circuit 22 calculates the data-to-centroid distance $DXV_i$, each cell 25a of the CID register section 25 receives, as a designated CID, the cluster ID of the corresponding cluster $C_i$. As with the cell 24a, when a carry occurs in the full adder 35, the data contents held in the cell 25a are updated with the received cluster ID. Consequently, the cluster ID of the cluster $C_i$ corresponding to the minimum data-to-centroid distance $DXV_i$ is held in the cell 25a. In other words, the cluster ID held in the cell 25a indicates the cluster ID of a cluster to which the corresponding element data X is assigned.

Figure 5:
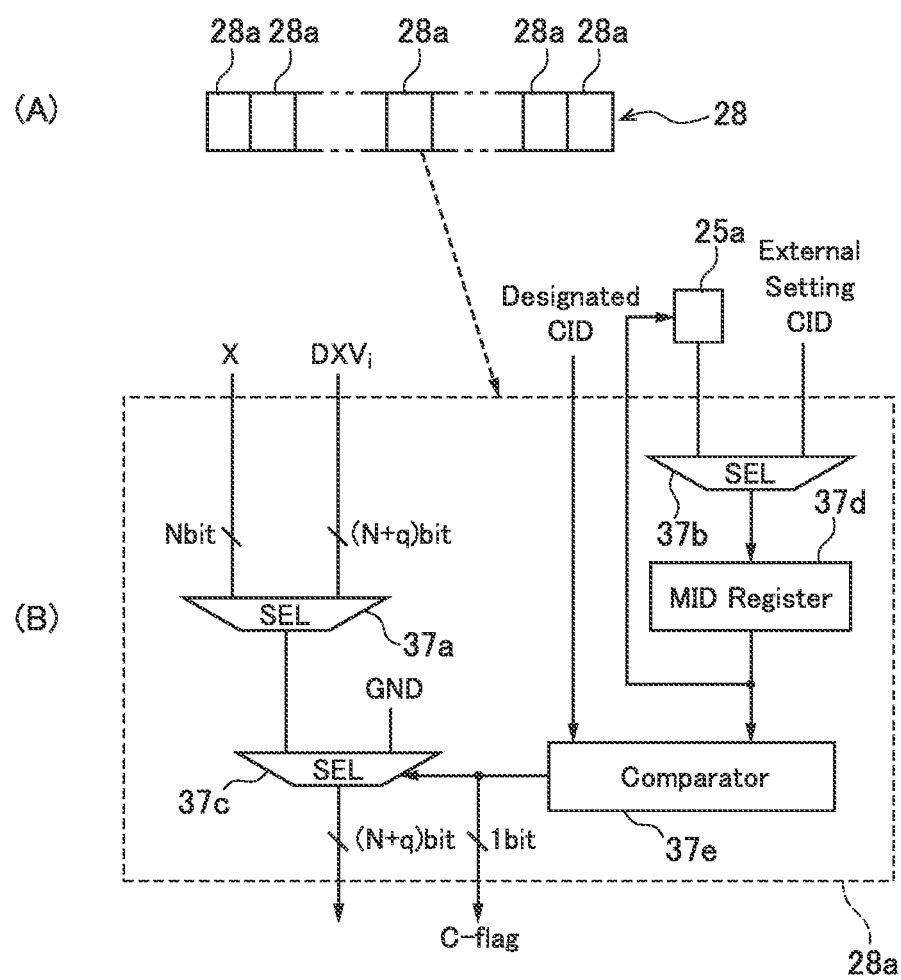
FIG. 5 is a circuit diagram illustrating the configuration of a CID mask circuit.
Figure 7:
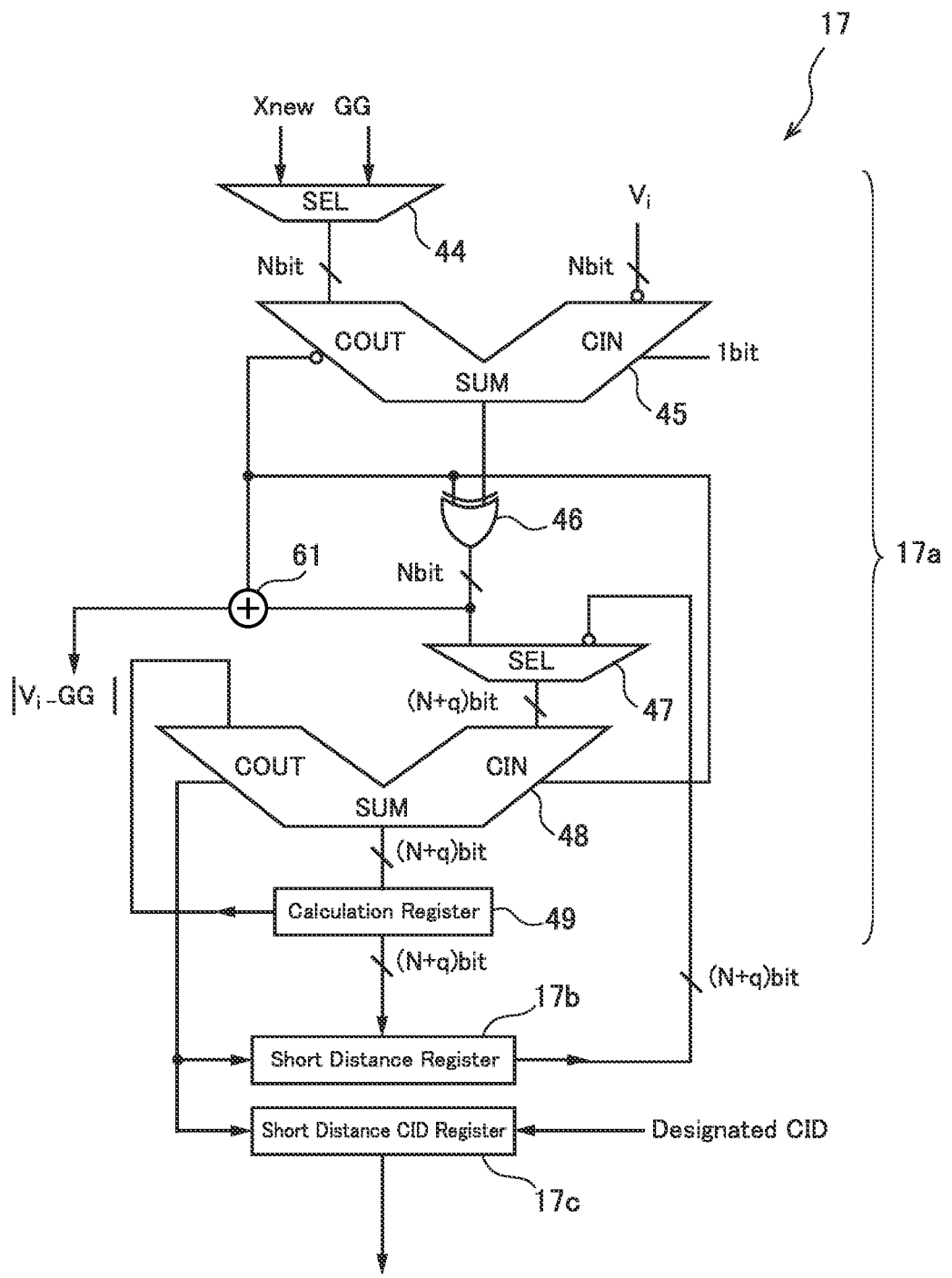
FIG. 7 is a circuit diagram illustrating the configuration of a neighbor search circuit.

Data buses for transmitting various data in the computation unit 12 have a bus width (the number of bits) depending on data to be transmitted. For example, since the input terminals of the full adder 32 receive N-bit vector components of the element data X and the cluster centroid $V_i$ in parallel, N-bit buses are connected to the input terminals. Between the full adder 35 and the calculation register 36, (N+q)-bit data-to-centroid distance $DXV_i$ is transmitted in parallel, a (N+q)-bit bus is used. For a data bus for selectively outputting one of the element data X and the cluster centroid $V_i$, such as a data bus of a selector 37c of the CID mask circuit 28, its bus width is tailored to the larger of the number of bits, and a (N+q)-bit bus corresponding to the cluster centroid $V_i$ is employed in the embodiments. The bus widths of the main parts are shown in FIGS. 3, 5 and 7.

In the distance register section 24 and the CID register section 25, an enable signal circuit 71 (see FIG. 9) is provided for each pair of cells 24a and 25a. The enable signal circuit 71 is configured to cause switching between enabling and disabling latch operation of the corresponding pair of cells 24a and 25a. When an enable signal is input into the pair of cells 24a and 25a from the enable signal circuit 71, the switching between enabling and disabling the latch operation of the pair of cells 24a and 25a is performed at the timing of various operations. By providing such an enable signal circuit 71, the system controller 11 no longer needs to control the cells 24a and 25a individually. The cell 25a is capable of latching the data contents of the corresponding cell 28a, and vice versa.

The maximum detection circuit 27 is configured to compare, at the time of initial setting of the cluster centroid $V_i$ of the cluster $C_i$, the data-to-centroid distances $DXV_i$ held in the distance register section 24 with each other and detect the maximum value of the data-to-centroid distances $DXV_i$. The maximum detection circuit 27 is then configured to output M maximum flags (1 bit) corresponding to the M cells 24a. As one example shown in FIG. 4, the maximum detection circuit 27 includes an AND circuit 27a with M-bit inputs, and M sets of an OR circuit 27b, a NAND circuit 27c, and a 1-bit register 27d, the M sets being corresponding to the M cells 24a of the distance register section 24. The OR circuit 27b, the NAND circuit 27c, and the register 27d which correspond to the cell 24a are connected to each other. Each cell 24a sends data of the data-to-centroid distance $DXV_i$ held in the cell 24a to the maximum detection circuit 27 sequentially one bit at a time from higher-order bits.

The OR circuit 27b has a first input terminal receiving an inversion signal of a one-bit signal from the corresponding cell 24a, and a second input terminal receiving an inversion signal of an output from the register 27d. The NAND circuit 27c has a first input terminal receiving an output from the OR circuit 27b, and a second input terminal receiving an inversion signal of an output from the AND circuit 27a. The register 27d holds a logic of an output ("1" or "0") of the NAND circuit 27c, and outputs the logic held in the register 27d. With such a configuration, after sending of all the bits of the data-to-centroid distances $DXV_i$ from the cells 24a is completed, only the logic held in the register 27d associated with the cell 24a that holds the maximum data-to-centroid distance $DXV_i$ among the data-to-centroid distances $DXV_i$ held in the distance register section 24 is set to "1". The data contents of the registers 27d are output to the corresponding cells 28a of the CID mask circuit 28 as a maximum flag indicating whether the data-to-centroid distance $DXV_i$ is the maximum.

The CID mask circuit 28 is configured to output data required only for a process among the element data X that are input from the main memory 14 or the data-to-centroid distances $DXV_i$ that are input from the distance register section 24.

As shown in Part (A) of FIG. 5, the CID mask circuit 28 has the M cells 28a. As one example shown in Part (B) of FIG. 5, each of the cells 28a includes selectors 37a to 37c, an MID register 37d, and a comparator 37e. Each MID register 37d is provided with an enable signal circuit 75 (see FIG. 10) as with the cells 24a and 25a, whereby the system controller 11 no longer needs to control the MID registers 37d individually. When an enable signal is input into the MID register 37d from the enable signal circuit 75, switching between enabling and disabling the latch operation of the MID register 37d is performed at the timing of various operations.

The selector 37a is configured to select one of the element data X and the data-to-centroid distance $DXV_i$ as input data, and output the selected data to the selector 37c. The selector 37b is configured to select one of the cluster ID from the cell 25a of the CID register section 25 and an external setting ID (cluster ID) from the system controller 11, and output the selected data to the MID register 37d.

The MID register 37d is configured to hold the cluster ID from the selector 37b by the latch operation, and output the cluster ID held in the MID register 37d to the comparator 37e. The comparator 37e is configured to compare the designated CID with the cluster ID from the MID register 37d, output a one-bit comparison flag (C-flag) indicating its comparison result to the outside, and output the comparison flag to the selector 37c. The comparison flag is "1" when the designated CID is identical with the cluster ID from the MID register 37d, and the comparison flag is "0" when the designated CID is not identical with the cluster ID.

The selector 37c outputs the input data (which is the element data X or the data-to-centroid distance $DXV_i$) if the comparison flag from the comparator 37e is "1", and outputs null data with all bits set to "0" if the comparison flag is "0". Therefore, when the MID register 37d holds the cluster ID in the corresponding cell 25a of the CID register section 25, the element data X or the data-to-centroid distance $DXV_i$ associated with the cluster ID that is identical with the designated CID is output from the cell 28a, and the comparison flag of "1" is output from the cell 28a.

The centroid calculation circuit 29 is configured to calculate the data gravity center GG and the cluster centroid $V_i$ based on the element data X and the comparison flags that are input from the CID mask circuit 28. In addition, the centroid calculation circuit 29 is configured to output, to the evaluation score calculation circuit 18, the number of data points $n_i$ and a data addition value $SS_i$ which are acquired during the calculation of the cluster centroid $V_i$. The number of data points $n_i$ and the data addition value $SS_i$ are used to calculate the second index value $SBS_i$ and the like by the evaluation score calculation circuit 18. Further, the centroid calculation circuit 29 is configured to calculate the compactness index value $SWD_i$ based on the element data X and the comparison flags that are input from the CID mask circuit 28, and send the calculated value to the evaluation score calculation circuit 18. As described above, the compactness index value $SWD_i$ is obtained by dividing the first index value $SD_i$ by the number of data points $n_i$, the first index value $SD_i$ being the sum of the within-cluster distances $DXV_i$.

As represented in Formula (6), the data addition value $SS_i$ described above is obtained by adding the element data X of the cluster $C_i$ for each dimension, and is a q-dimensional vector as with the element data X. As represented in Formula (7), the cluster centroid $V_i$ is obtained by dividing the data addition value $SS_i$ by the number of data points $n_i$. The data gravity center GG is obtained by dividing a data addition value of all the element data X by the total number of data. The centroid calculation circuit 29 is configured to send the cluster centroid $V_i$ to the centroid memory 15 and the distance calculation circuit 22.

[Formula 3]

$$SS_i = \Sigma X \in c_i X \qquad (6)$$

$$V_i = SS_i/n_i \qquad (7)$$

Figure 6:
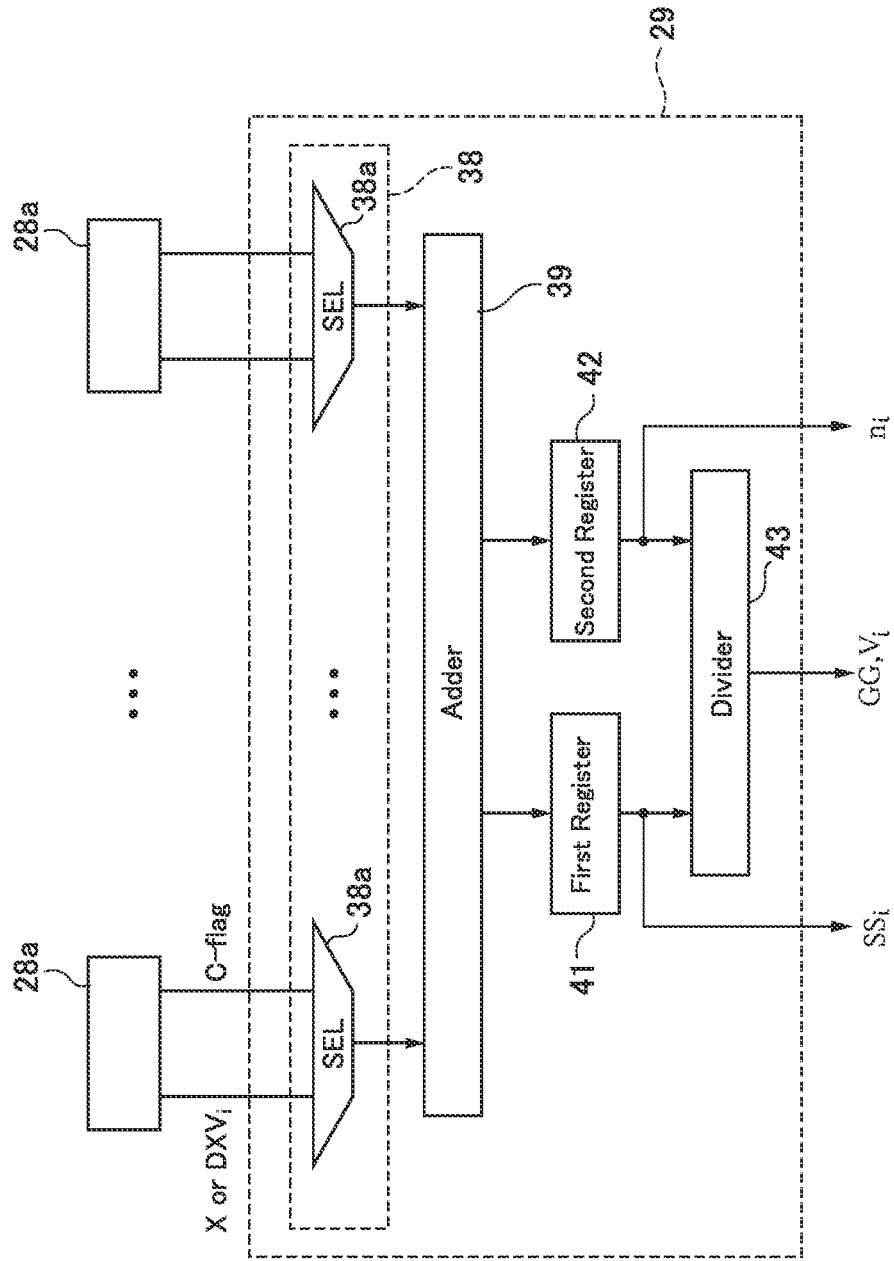
FIG. 6 is a circuit diagram illustrating the configuration of a centroid calculation circuit.

As one example shown in FIG. 6, the centroid calculation circuit 29 includes a selector section 38 having M selectors 38a, an adder 39, a first register 41, a second register 42, and a divider 43. Each of the selectors 38a is configured to select one of output data (the element data X or the data-to-centroid distance $DXV_i$) and the comparison flag (C-flag) from the CID mask circuit 28 in sequence, and output the selected data to the adder 39. The adder 39 is configured to add the input data.

When the element data X or the data-to-centroid distance $DXV_i$ are input into the adder 39 from the selector section 38, the first register 41 holds the calculation result by the adder 39. The data addition value is held in the first register 41 when the element data X are input into the adder 39, and the first index value $SD_i$ is held in the first register 41 when the data-to-centroid distances $DXV_i$ are input into the adder 39. When the comparison flags are input from the selector section 38, the adder 39 adds the comparison flags, each of which is 1-bit data, and the calculated value is held in the second register 42. The second register 42 holds the number of the element data X or the number of the data-to-centroid distances $DXV_i$ output from the CID mask circuit 28, thus obtaining the number of data points $n_i$ or the total number of data. In the embodiments, the adder 39 functions as a data adder when the element data X are input thereto, and functions as a quantity calculator when the comparison flags are input thereto.

The divider 43 is configured to divide the value held in the first register 41 by the value held in the second register 42, and output the calculated value. The divider 43 obtains and outputs the data gravity center GG, the cluster centroid $V_i$, and the compactness index value $SWD_i$.

The neighbor search circuit section 17, the system controller 11 and the centroid memory 15 constitute an update process section. The update process section and the batch process section described above constitute a clustering section. The neighbor search circuit section 17 is configured to identify, at the time of the update process, the cluster ID of the cluster $C_i$ corresponding to the minimum data-to-centroid distance $DXV_i$ between the cluster centroid $V_i$ and the new element data Xnew to be added, and assign the new element data Xnew to the identified cluster $C_i$.

The neighbor search circuit section 17 includes a calculation section 17a, a short distance register section 17b, and a short distance CID register section 17c. The calculation section 17a is configured to calculate the data-to-centroid distance $DXV_i$ between the new element data Xnew and each of the cluster centroids $V_i$ sequentially read from the centroid memory 15. The short distance register section 17b and the short distance CID register section 17c are configured to hold the minimum data-to-centroid distance $DXV_i$ and the cluster ID, respectively, based on the calculation result by the calculation section 17a. The cluster ID held finally in the short distance CID register section 17c is the cluster ID of the cluster $C_i$ to which the new element data Xnew is assigned. The cluster ID held finally in the short distance CID register section 17c is written into the cell 25a of the CID register section 25 corresponding to the new element data Xnew. A part of the calculation circuits constituting the neighbor search circuit section 17 is used to calculate the evaluation score E(Nc) at the time of the update process.

As one example shown in FIG. 7, the calculation section 17a includes a selector 44, a full adder 45, an XOR circuit 46, a selector 47, a full adder 48, a calculation register 49, and an adder 61. The calculation section 17a sequentially calculates the data-to-centroid distances $DXV_i$ between the new element data Xnew and each of the cluster centroids $V_i$. The minimum data-to-centroid distance $DXV_i$ is held in the short distance register section 17b, and the cluster ID corresponding to the minimum data-to-centroid distance $DXV_i$ is held in the short distance CID register section 17c. The circuit configuration of the neighbor search circuit section 17 including the calculation section 17a, the short distance register section 17b, and the short distance CID register section 17c is the same as that of the cells 22a of the distance calculation circuit 22, the cells 24a of the distance register section 24, and the cells 25a of the CID register section 25, and thus the detailed explanation thereof will not be given here.

In calculating the evaluation score E(Nc) at the time of the update process, the full adder 45, the XOR circuit 46, and the adder 61 are used to calculate the global-gravity-to-centroid distance $DGV_i$ between the data gravity center GG and the cluster centroid $V_i$ of the cluster to which the new element data Xnew is assigned. The global-gravity-to-centroid distance $DGV_i$ is sent to the evaluation score calculation circuit 18. The cluster centroid $V_i$ is input from the centroid memory 15.

Figure 8:
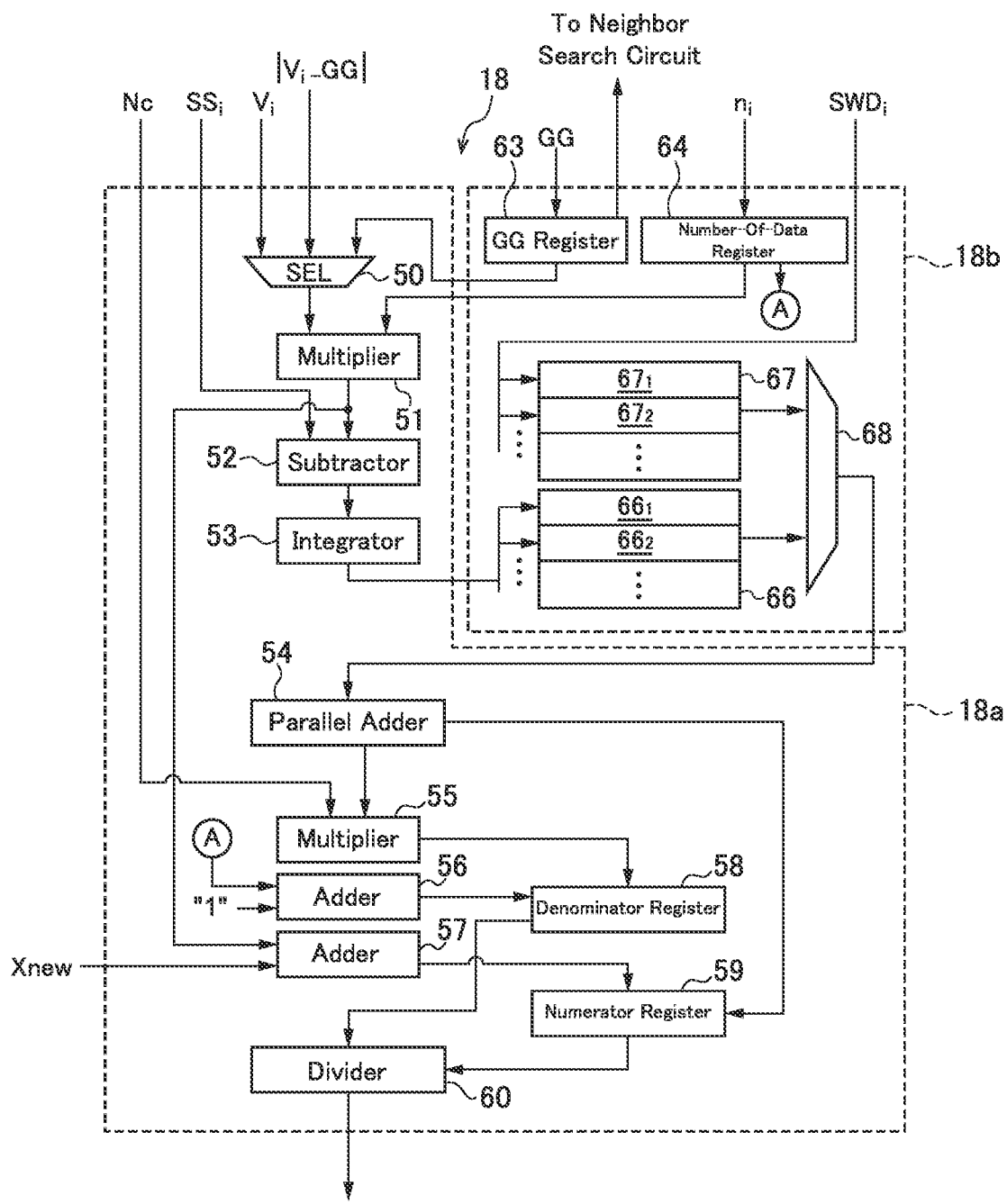
FIG. 8 is a block diagram illustrating the configuration of an evaluation score calculation circuit.

The evaluation score calculation circuit 18 is served as an evaluation score calculation section, and is configured to calculate the evaluation scores E(Nc) every time each clustering is over in the batch process and at the time of the update process. As one example shown in FIG. 8, the evaluation score calculation circuit 18 includes a logic section 18a and an evaluation register section 18b. The logic section 18a includes a selector 50, a multiplier 51, a subtractor 52, an integrator 53, a parallel adder 54, a multiplier 55, adders 56 and 57, a denominator register 58, a numerator register 59, and a divider 60. The logic section 18a is configured to calculate the evaluation score E(Nc) following Formula (1) described above using various data held in the evaluation register section 18b, the number of clusters Nc input from the system controller 11, and the like. In addition, the logic section 18a is configured to calculate, at the time of the update process, the cluster centroid $V_i$ of the cluster to which the new element data Xnew is assigned, and write the calculated value into the centroid memory 15. The operation of the evaluation score calculation circuit 18 will be described in detail later.

The evaluation register section 18b includes a GG register 63, a number-of-data register 64, an SBS register unit 66, an SWD register unit 67, and a selector 68. The GG register 63 is configured to hold the data gravity center GG calculated by the centroid calculation circuit 29. The number-of-data register 64 is configured to hold the number of data points $n_i$ of each cluster $C_i$ obtained by the centroid calculation circuit 29. The GG register 63 may not be needed if the data gravity center GG is stored in the centroid memory 15. Non-volatile registers are preferably employed as the GG register 63, the number-of-data register 64, the SBS register unit 66, and the SWD register unit 67.

The SBS register unit 66 includes a first SBS register $66_1$, a second SBS register $66_2$, . . . . An i-th SBS register $66_i$ is configured to hold the second index value $SBS_i$ obtained from the data addition value $SS_i$. The SWD register unit 67 includes a first SWD register $67_1$, a second SWD register $67_2$, . . . . An i-th SWD register $67_i$ is configured to hold the compactness index value $SWD_i$. The selector 68 is configured to select one of the SBS register unit 66 and the SWD register unit 67, and send data held in the selected register unit to the logic section 18a.

Figure 9:
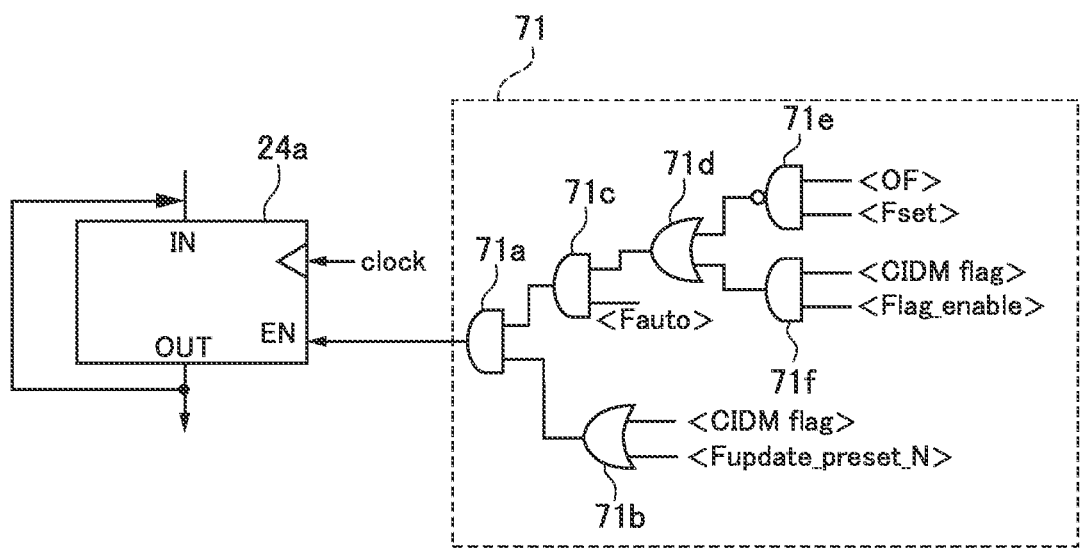
FIG. 9 is a circuit diagram illustrating an enable signal circuit that is connected to each cell of a distance register section.

FIG. 9 illustrates an example of the enable signal circuit 71 that is connected to each cell 24a of the distance register section 24 and the corresponding cell 25a of the CID register section 25. As described earlier, the enable signal circuit 71 is provided for each pair of the cells 24a and 25a. Although the enable signal circuit 71 is also connected to the cell 25a of the CID register section 25, the cell 25a is not shown in FIG. 9.

The enable signal circuit 71 includes AND circuits 71a, 71c, and 71f, OR circuits 71b and 71d, and a NAND circuit 71e. The OR circuit 71b receives input of a first control signal (CIDM flag) and a second control signal (Fupdate_p-reset_N), the NAND circuit 71e receives input of a third control signal (OF) and a fourth control signal (Fset), and the AND circuit 71f receives input of the first control signal and a fifth control signal (Flag_enable). The OR circuit 71d receives the output from the NAND circuit 71e and the output from the AND circuit 71f. The AND circuit 71c receives the output from the OR circuit 71d and input of a sixth control signal (Fauto). The AND circuit 71a receives the output from the AND circuit 71c and the output from the OR circuit 71b. The cell 24a, which is a register of the distance register section 24, has an enable terminal into which the output from the AND circuit 71a is input as an enable signal.

Each cell 24a is configured to receive, via a selector (not illustrated), input of any of data for initialization, the data contents of the calculation register 36, and data read by the cell 24a itself (data-to-centroid distance). The data for initialization is data with all bits set to "1" or data with all bits set to "0". In addition, each cell 24a is configured to shift data held in the cell 24a toward higher-order bits like a shift register, thereby outputting the data sequentially one bit at a time from the highest-order bit. In this case, the data read by the cell 24a are returned to the input terminal. Consequently, the data contents of the cell 24a are returned to the original state upon completion of sending of all the bits.

The first to sixth control signals are generated within the computation unit 12. The first control signal is the comparison flag. The first control signal is the comparison flag output from the cell 28a of the CID mask circuit 28. The third control signal is the carry signal of the full adder 35. The second, fourth, fifth, and sixth control signals are signals from the system controller 11. The second control signal is a low-active signal for controlling the initialization of the data contents of each cell 24a of the distance register section 24. The fourth control signal is a set signal that is set to either "1" or "0". The fifth control signal is a signal for enabling the first control signal (comparison flag). The sixth control signal is a signal for supporting automatic update of each cell 24a of the distance register section 24 at the time of the classification calculation.

For example, in initializing the distance register section 24 in such a manner that the maximum value (data with all bits set to "1") is written into each of the cells 24a associated with the element data X and the minimum value (data with all bits set to "0") is left in the other cells 24a, the enable signal circuit 71 operates as follows. This initialization is carried out in such a way that data with each bit set to "0" is written into each cell 24a of the distance register section 24 in advance, "1" is held in the MID register 37d of each of the cells 28a associated with the element data X, and "0" is held in the other MID registers 37d to initialize the CID mask circuit 28, and the designated CID of "1" is input into the comparator 37e. In addition, the initialization is carried out with the data contents of each of the cells 25a of the CID register section 25 set to "1". Further, the data for initialization with all bits set to "1" is input into each of the cells 24a.

At the timing of the initialization described above, the second control signal is set to "0", the third control signal is set to "0", the fourth control signal is set to "1", the sixth control signal is set to "1", and the fifth control signal is set to "1" (or may be "0"). Meanwhile, among the comparison flags (first control signal) from the CID mask circuit 28 which is set as described above, the comparison flags associated with the element data X are set to "1" whereas the other comparison flags are set to "0". Consequently, the enable signal of each of the cells 22a associated with the element data X is set to "1" and the enable signal of the other cells 22a is set to "0", and only the cells 24a associated with the element data X latch and hold the data for initialization with all bits set to "1".

In the classification calculation, the second control signal is set to "1", the fourth control signal is set to "1", the fifth control signal is set to "0", and the sixth control signal is set to "1". Consequently, an enable signal having the same logic as the third control signal which is the carry signal of the full adder 35 is input irrespective of the first control signal (comparison flag). As a result, when a carry occurs in the full adder 35, that is, when the data-to-centroid distance $DXV_i$ held in the calculation register 36 is smaller than the data-to-centroid distance $DXV_i$ held in the cell 24a, the enable signal is set to "1", and this cell 24a latches and holds the data-to-centroid distance $DXV_i$ held in the calculation register 36.

When the cluster ID of the cluster $C_i$ to which the new element data Xnew is assigned is written into the cell 25a of the CID register section 25, firstly, the data contents of the MID register 37d of the cell 28a of the CID mask circuit 28 associated with the new element data Xnew are set to the cluster ID of the cluster to which the new element data is assigned. In addition, the cluster ID is input into each cell 25a and each comparator 37e as the designated CID. Under this condition, the second control signal is set to "0", the fourth control signal is set to "1", the fifth control signal is set to "0", and the sixth control signal is set to "1". As a result, the enable signal of only the cell 25a with the first control signal (comparison flag) of "1" is set to "1". Since the comparison flag from only the cell 28a associated with the new element data Xnew is set to "1", the cluster ID of the cluster to which the new element data Xnew is assigned is written only into the cell 25a associated with the new element data Xnew.

Figure 10:
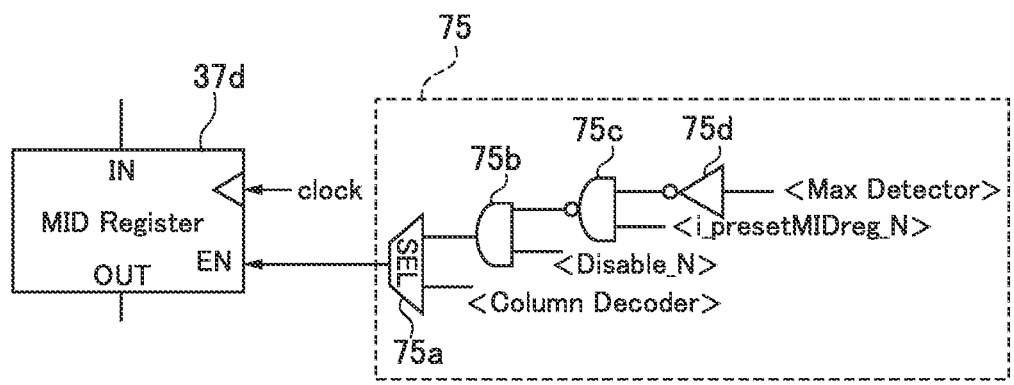
FIG. 10 is a circuit diagram illustrating an enable signal circuit that is connected to a MID register.

FIG. 10 illustrates an example of the enable signal circuit 75 that is provided for the MID register 37d of the CID mask circuit. As described above, the enable signal circuit 75 is provided for each MID register 37d. The enable signal circuit 75 includes a selector 75a, an AND circuit 75b, a NAND circuit 75c, and a NOT circuit 75d. The NOT circuit 75d receives input of a seventh control signal (Max Detector). The NAND circuit 75c receives the output of the NOT circuit 75d and an eighth control signal (i_presetMIDreg_N). The AND circuit 75b receives the output of the NAND circuit 75c and a ninth control signal (Disable_N). The selector 75a receives the output of the AND circuit 75b and a tenth control signal (Column Decoder), and outputs one of them as an enable signal to an enable terminal of the MID register 37d.

The seventh control signal is the maximum flag from the maximum detection circuit 27. At the time of setting an initial value of a new cluster centroid $V_i$, the seventh control signal is used to control the latch operation of the MID register 37d. The eighth control signal is a low-active signal from the system controller 11, and is used to control the latch operation of the MID register 37d at the time of initialization. The ninth control signal is a low-active signal from the system controller 11, and causes switching between enabling and disabling the eighth control signal. The tenth control signal is a column decode signal of the main memory 14, and is a signal for controlling the cells 28a of the CID mask circuit 28 associated with the columns of the main memory 14. The tenth control signal is used as an enable signal to designate the data contents of the MID register 37d by the external setting CID, for example. Specifically, the tenth control signal is used for designating an unused cell 28a for the new element data Xnew to be added in the future, for example. The tenth control signal is a signal from the system controller 11.

Figure 11:
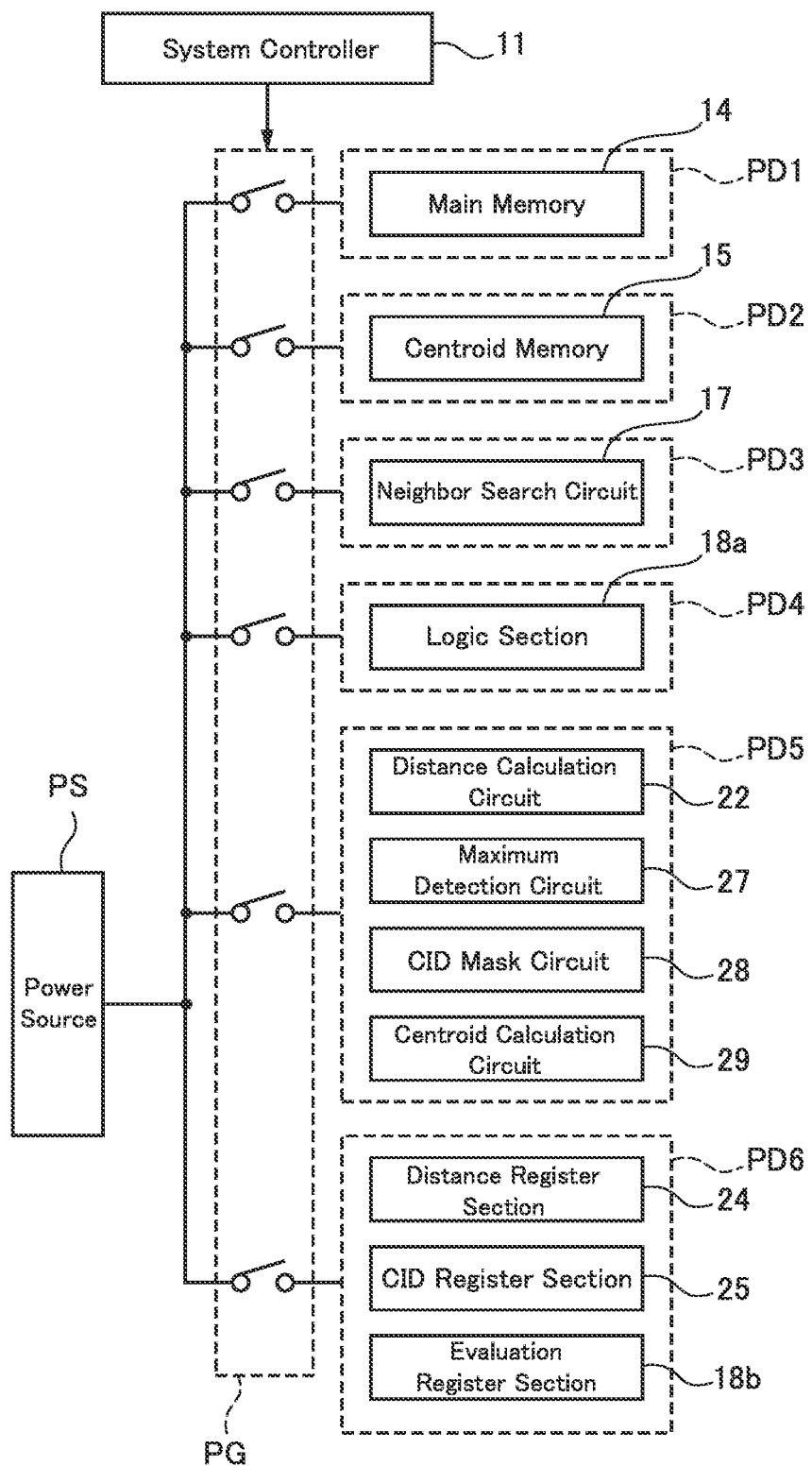
FIG. 11 is an explanatory diagram illustrating power domains of a computation unit.

As shown in FIG. 11, the computation unit 12 having the configuration described above has first to sixth power domains PD1 to PD6. The system controller 11 controls power supply from a power source PS to the first to sixth power domains PD1 to PD6 independently via a gate circuit section PG. The system controller 11 supplies power at a required timing to a power domain including a circuit necessary for calculation.

In the embodiments, the main memory 14 is provided in the first power domain PD1, the centroid memory 15 is provided in the second power domain PD2, the neighbor search circuit section 17 is provided in the third power domain PD3, and the logic section 18a of the evaluation score calculation circuit 18 is provided in the fourth power domain PD4. The distance calculation circuit 22, the maximum detection circuit 27, the CID mask circuit 28, and the centroid calculation circuit 29 of the clustering computation section 16 are provided in the fifth power domain PD5. The distance register section 24 and the CID register section 25 of the clustering computation section 16 and the evaluation register section 18b of the evaluation score calculation circuit 18 are provided in the sixth power domain PD6.

Figure 12:
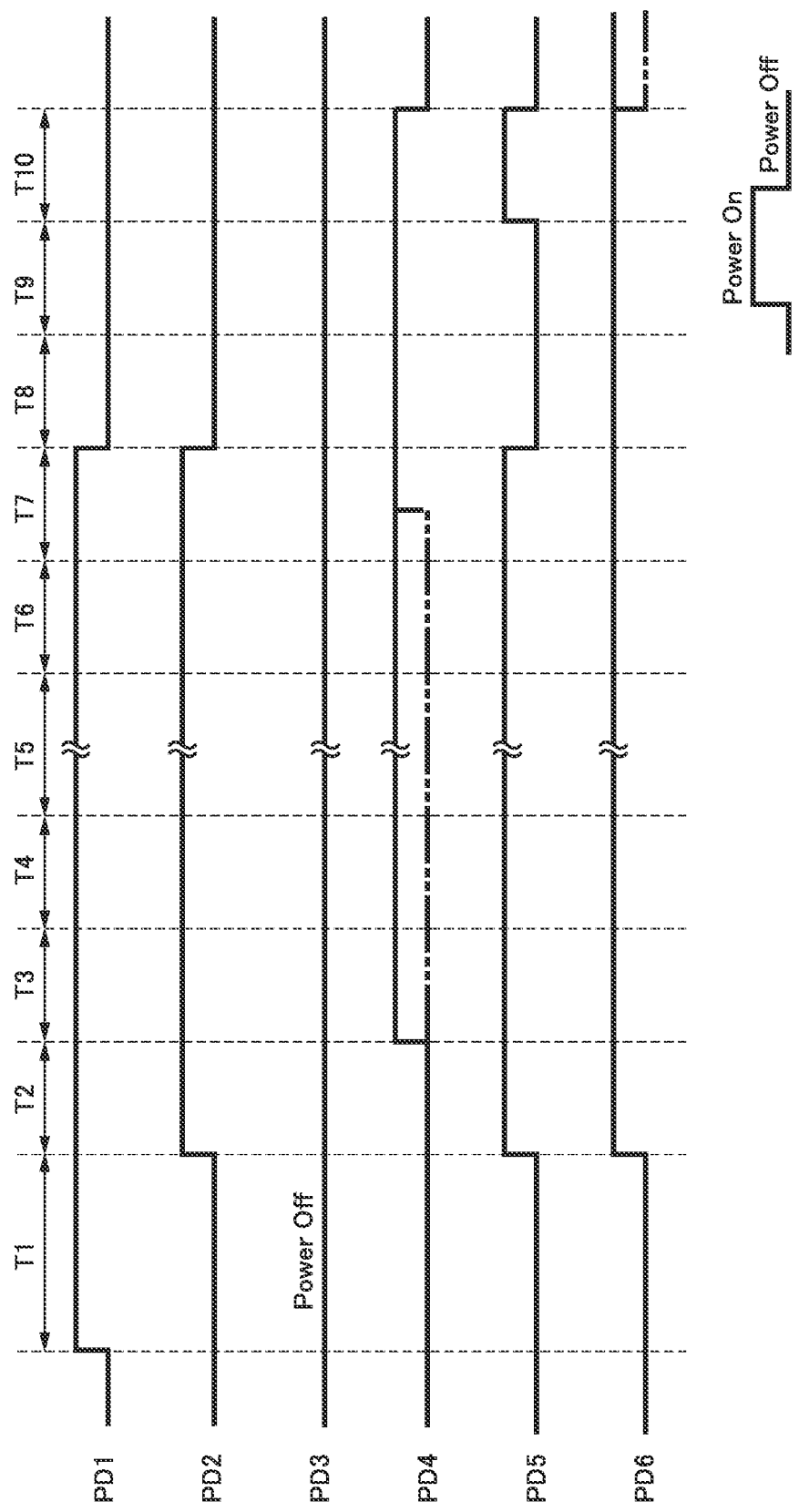
FIG. 12 is a timing chart illustrating timing of power supply to the power domains in a batch process.

FIG. 12 illustrates a power supply status in writing of the element data X into the main memory 14 and in the subsequent batch process. In a period T1, the power is supplied to the first power domain PD1 of the main memory 14 to write the element data X into the main memory 14. The power supply to the first power domain PD1 continues until clustering is over. A period T2 is a period for initially setting an initial cluster centroid $V_i$ for clustering. In the period T2, the power supply to the second power domain PD2, the fifth power domain PD5, and the sixth power domain PD6 starts. However, the power supply to the fourth power domain PD4 is suspended because no calculation of the second index value $SBS_i$ is performed by the logic section 18a in the period T2.

In a period T3, the power supply to the fourth power domain PD4 starts. The periods T3 to T7 are periods in which the computation unit 12 actually performs classification calculation for clustering. In the periods T3 to T7, the power is supplied to each power domain except for the third power domain PD3 of the neighbor search circuit section 17 used for the update process.

In a period T8 after the last classification calculation is over, the power supply to the first power domain PD1, the second power domain PD2, and the fifth power domain PD5 stops. In the periods T8 to T10, the power supply to the fourth power domain PD4 and the sixth power domain PD6 continues in order for the logic section 18a of the evaluation score calculation circuit 18 to calculate the evaluation score E(Nc). In the period T10 for calculating the evaluation score E(Nc), the power is supplied to the fifth power domain PD5 in order to calculate the compactness index value $SWD_i$ using the clustering computation section 16.

The periods T2 to T10 are process periods for a specific single number of clusters Nc. In order to obtain the optimum number of clusters Nc, the same power supply control performed during the periods T2 to T10 is iterated in the batch process. In the embodiments, since the second index value $SBS_i$ is obtained by the logic section 18a for each classification calculation and updated as needed, the power is supplied to the fourth power domain PD4 since the period T3. In updating the second index value $SBS_i$ as needed in the above manner, the second index value $SBS_i$ as a final value is obtained concurrently with the convergence of the cluster centroid $V_i$. This eliminates the need to calculate each cluster centroid $V_i$ again to acquire the second index value $SBS_i$ after the convergence of the cluster centroid $V_i$, which is advantageous in terms of increasing the speed of clustering.

Since only the second index value $SBS_i$ as the final value needs to be acquired, it is also possible to supply power to the fourth power domain PD4 to calculate the second index value $SBS_i$ after detecting the convergence of the data-to-centroid distance $DXV_i$ and before calculation of a next cluster centroid $V_i$ starts as illustrated by a chain double-dashed line, for example. This is advantageous in terms of power saving.

Figure 13:
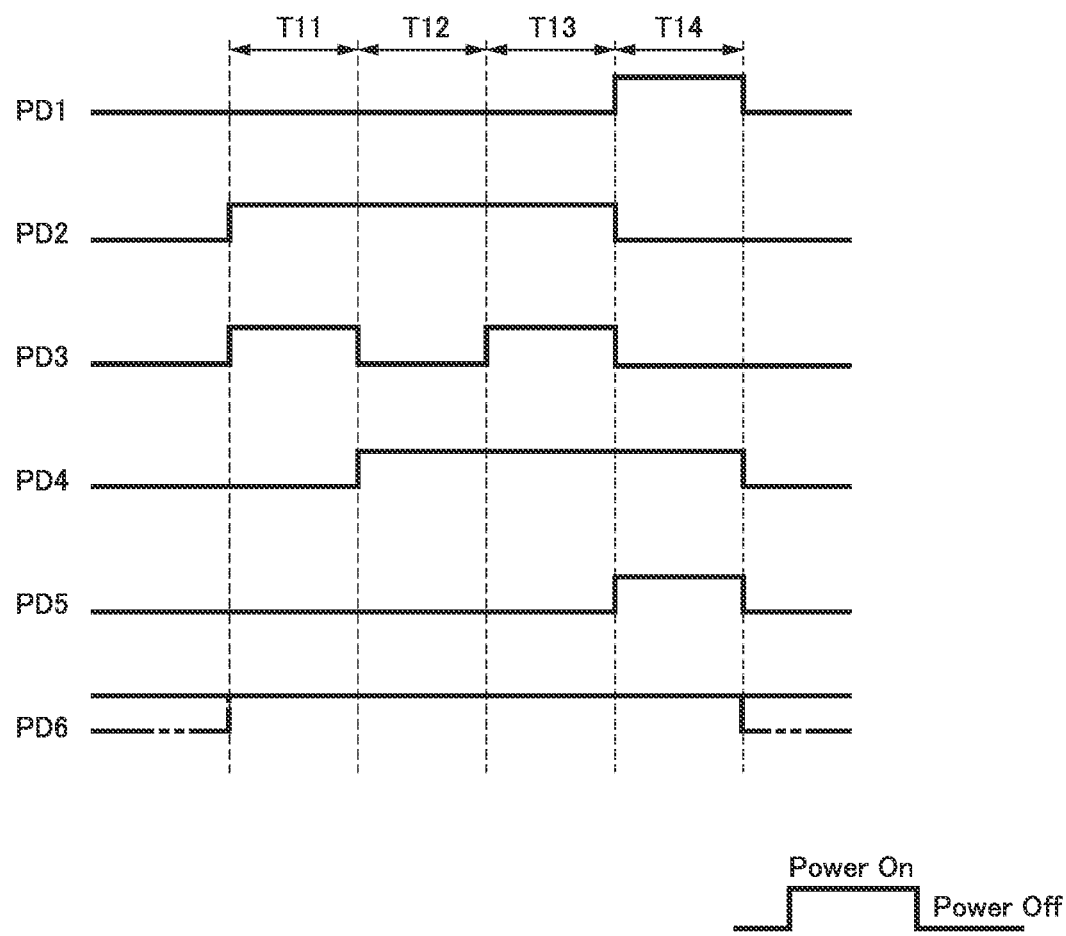
FIG. 13 is a timing chart illustrating timing of power supply to the power domains in an update process.

FIG. 13 illustrates a power supply status in the update process. In the update process, the neighbor search circuit section 17 identifies the cluster ID of the cluster corresponding to the minimum data-to-centroid distance $DXV_i$ using the new element data Xnew and each of the cluster centroids $V_i$ read from the centroid memory 15. Therefore, in a first period T11, the power is supplied to the second power domain PD2 of the centroid memory 15 and the third power domain PD3 of the neighbor search circuit section 17. The power supply to the sixth power domain PD6 continues since the period T11.

In a period T12 after the cluster ID is identified by the neighbor search circuit section 17, the power supply to the third power domain PD3 stops. Instead, the power supply to the fourth power domain PD4 starts in order for the logic section 18a to calculate the new cluster centroid $V_i$ of the cluster $C_i$ to which the new element data Xnew is assigned.

In a period T13, the power supply to the fourth power domain PD4 continues in order for the logic section 18a to calculate the new second index value $SBS_i$ of the cluster $C_i$ to which the new element data Xnew is assigned. In the period T13, the power is supplied to the third power domain PD3 in order for the neighbor search circuit section 17 to calculate the global-gravity-to-centroid distance $DGV_i$ which is necessary for calculation of the new second index value $SBS_i$. In a period T14, the power supply to the second power domain PD2 and the third power domain PD3 stops, and the power supply to the fifth power domain PD5 starts in order to calculate the new compactness index value $SWD_i$ using the clustering computation section 16. In the period T14, the evaluation score E(Nc) is calculated by the logic section 18a. Upon completion of the period T14, the power supply to each power domain stops except for the sixth power domain PD6.

If the SBS register unit 66 and the SWD register unit 67 of the evaluation register section 18b have a non-volatile configuration, it is possible to control the power supply and suspension of the power supply to the sixth power domain PD6 as illustrated by a chain double-dashed line in FIG. 12 and FIG. 13. For example, in the batch process, it is possible to stop the power supply to the sixth power domain PD6 upon completion of the calculation of the evaluation score E(Nc). In the update process, it is possible to start the power supply to the sixth power domain PD6 in the period T11 and stop the power supply upon completion of the update process.

Alternatively, the data contents of the SBS register unit 66 and the SWD register unit 67 of the evaluation register section 18b can be saved in another memory before suspension of the power supply to the sixth power domain PD6, and the saved data contents can be restored after the start of the power supply to the sixth power domain PD6. In addition, the power supply to the sixth power domain PD6 can be maintained when the update process is performed continuously after the batch process or when the batch process is performed continuously after the update process.

Reference will now be made to how the above configuration works. The element data X are written into the main memory 14. If there are some columns into which no element data are written among the columns of the main memory 14, "0" is written into each of the unit blocks of such columns. If no batch process has been executed yet under the condition that the main memory 14 stores the element data X, the batch process starts.

Figure 14:
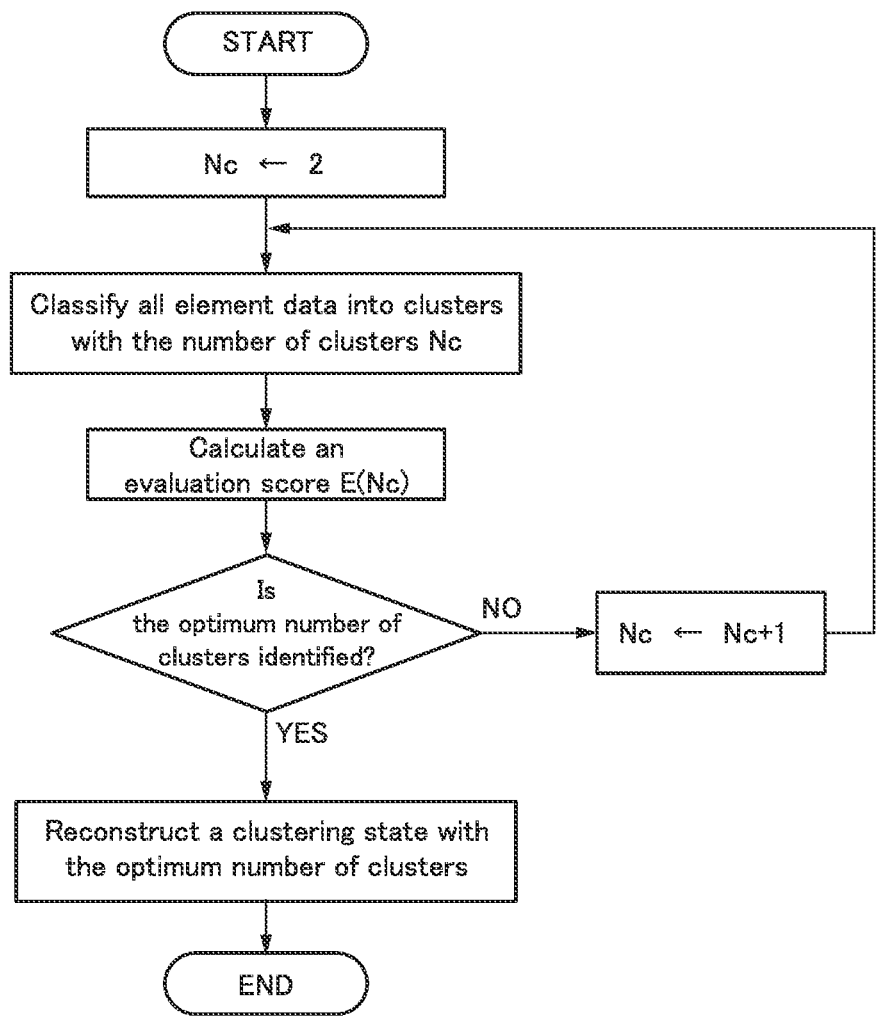
FIG. 14 is a flowchart illustrating a schematic procedure of the batch process.

In the batch process of this example, as shown in FIG. 14, all the element data X are classified into clusters with the number of clusters Nc while the number of clusters Nc is incremented by 1, and the evaluation score E(Nc) is calculated for each clustering process. Then, the optimum number of clusters is determined to be the number of clusters Nc obtained when the evaluation score E(Nc) changes from an increase to a decrease. That is, the number of clusters Nc obtained when the evaluation score E(Nc+1) is smaller than the previous evaluation score E(Nc) is set as the optimum number of clusters. Then, the element data are classified into clusters with the optimum number of clusters Nc. Alternatively, the number of clusters Nc corresponding to the maximum evaluation score within a preset range of the number of clusters may be determined as the optimum number of clusters.

Prior to clustering in the batch process, the distance register section 24 is initialized in such a manner that the maximum value is written into each of the cells 24a associated with the written element data X and "0" is written into each of the cells 24a not associated with the element data X. Meanwhile, the CID register section 25 is initialized in such a manner that "1" is written into each of the cells 25a associated with the written element data X and "0" is written into each of the cells 25a not associated with the element data X. Thereafter, the MID register 37d of each of the cells 28a of the CID mask circuit 28 latches and holds the cluster ID in the corresponding cell 25a.

In clustering to be described below, data is read from all the columns of the main memory 14; however, by initializing the distance register section 24, the CID register section 25, and the CID mask circuit 28 as described above, data other than the element data X does not affect various calculations and their results. For this reason, no description will be provided for the data other than the element data X.

Under instructions from the system controller 11, the clustering device 10 starts a clustering process with the number of clusters Nc set to "2". In the clustering process, initial setting is performed first. In the initial setting, the data gravity center GG is obtained, and the element data X as an initial value of a cluster centroid $V_2$ is identified. Such element data X is identified by assigning the element data X as the initial value of the cluster centroid $V_2$ to a cluster $C_2$, and the data gravity center GG is temporarily set as a cluster centroid $V_1$.

First, the element data X is read from the main memory 14. The read element data X is sent to the CID mask circuit 28 and to the delay circuit 21. At this time, the CID mask circuit 28 receives "1" as the designated CID, and selects the element data X from the main memory 14 as input data. Thus, only the cell 28a having the MID register 37d holding "1" outputs the element data X, and only the comparison flag from the cell 28a has a value of "1". Accordingly, the comparison flag from the cell 28a associated with a column into which no element data X from the main memory 14 is written does not have a value of "1".

In the centroid calculation circuit 29, the selector section 38 selects, in its initial state, each comparison flag from the CID mask circuit 28, for example. Then, the number of comparison flags (the number of signals) having a value of "1" is calculated by the adder 39, and the calculated value is held in the second register 42. Subsequently, the selector section 38 selects the element data X and outputs the element data to the adder 39. Then, the data addition value, which is the q-dimensional vector, is calculated by adding the element data X for each dimension, and the data addition value is held in the first register 41. Thereafter, the divider 43 divides the data addition value held in the first register 41 by the number of flags held in the second register 42.

Since the cluster ID in each cell 25a associated with the element data X has a value of "1" due to the initialization, the data addition value and the number of flags calculated at this time are values obtained for all the element data X. Accordingly, the data gravity center GG is obtained as a result of the division by the divider 43.

The data gravity center GG obtained by the divider 43 in the above manner is held in the GG register 63 of the evaluation score calculation circuit 18. The system controller 11 acquires the data contents of the second register 42 as the number of all the element data X. Further, the data gravity center GG obtained by the divider 43 is input into the distance calculation circuit 22 as the temporary cluster centroid $V_1$.

In synchronization with the input of the temporary cluster centroid $V_1$, each element data X previously read from the main memory 14 is input into the distance calculation circuit 22. Each cell 22a of the distance calculation circuit 22 calculates the data-to-centroid distance $DXV_1$ from the input element data X and the temporary cluster centroid $V_1$. Then, if the data-to-centroid distance $DXV_1$ is smaller than the value held in the cell 24a of the distance register section 24 at that point, the data contents of the cell 24a are updated.

Since each cell 24a associated with the element data X holds the maximum value at this point in time, the data contents of each of the cells 24a associated with all the element data X are updated with the data-to-centroid distance $DXV_1$ calculated this time by the distance calculation circuit 22. At the same time, the data contents of each of the cells 25a of the CID register section 25 associated with the element data X are updated; however, since "1" is already given as the designated CID, no substantial change of the data contents is made. Since the distance "0" is given to each of the cells 24a not associated with the element data X in the initialization, no change is made to the data contents of such a cell 24a and the data contents of the corresponding cell 25a (cluster ID=0).

The data contents of each of the cells 24a are updated in the above manner, and the data-to-centroid distances $DXV_1$ held in all the cells 24a are input into the maximum detection circuit 27. Consequently, only one of the M maximum flags output from the maximum detection circuit 27 corresponding to the maximum of the input data-to-centroid distances $DXV_1$ is set to "1".

In the CID mask circuit 28, only the MID register 37d of the cell 28a corresponding to the maximum flag of "1" is allowed to perform the latch operation. In addition, an external setting CID of "2" is input into the MID register 37d. Therefore, in response to a clock after the change of the maximum flag as described above, only the data contents of the MID register 37d of the cell 28a corresponding to the maximum flag of "1" are updated with the data contents of the external setting CID ("2").

After the data contents of one MID register 37d are updated in the above manner, the first classification calculation is performed. In the first classification calculation, initialization for classification calculation, a process for the cluster $C_1$, and a process for the cluster $C_2$ are performed in this order.

First, the data contents of each of the cells 24a of the distance register section 24 and the data contents of each of the cells 25a of the CID register section 25 are initialized for classification calculation. Specifically, the cells 24a are initialized in such a manner that the maximum value is written into each of the cells 24a associated with the written element data X and "0" is written into each of the cells 24a not associated with the element data X. Meanwhile, the CID register section 25 is initialized in such a manner that "1" is written into each of the cells 25a associated with the written element data X and "0" is written into each of the cells 25a not associated with the element data X. Because the data contents of each of the cells 25a associated with the element data X are surely updated in the subsequent process, such cells 25a may be set to a value other than "1" in this initialization.

After the initialization for classification calculation is over, the process for the cluster $C_1$ is performed. The element data X is read from the main memory 14 and input into the delay circuit 21 and the CID mask circuit 28. At this time, in the CID mask circuit 28, the selector 37a is switched so that the element data X from the main memory 14 is input into the comparator 37e, and "1" is given to the comparator 37e as the designated CID. At this time, in each of the MID registers 37d of the CID mask circuit 28, only the data contents of the MID register 37d associated with the element data X which is the cluster centroid $V_2$ are set to "2" and the data contents of each of the MID registers 37d associated with the other element data X are set to "1".

Next, the process for the cluster $C_2$ is performed. The process for the cluster $C_2$ is the same as the process for the cluster $C_1$ described above except that "2" is used as the designated CID. Specifically, among the element data X read from the main memory 14 and input into the CID mask circuit 28, only the element data X corresponding to the cells 25a of the CID register section 25 having a value of "2" are input into the centroid calculation circuit 29. In addition, the comparison flags, the number of which is the same as that of the element data X output from the CID mask circuit 28, are set to "1". In the CID mask circuit 28, since only the data contents of the MID register 37d associated with the element data X which is the cluster centroid $V_2$ are set to "2" as described above, the element data X which is the cluster centroid $V_2$ is input into the centroid calculation circuit 29, and only one comparison flag is set to "1".

Upon input of the element data X into the respective cells 28a of the CID mask circuit 28, among the input element data X, only the element data X that are input into the cells 28a corresponding to the cells 25a having a value of "1" are output from the CID mask circuit 28, and the comparison flag from such cells 28a is set to "1".

Upon output of the element data X and the comparison flags from the CID mask circuit 28 in the above manner to the centroid calculation circuit 29, first, the adder 39 adds the input comparison flags to calculate the number of comparison flags having a value of "1", and the calculation result is held in the second register 42. In other words, the number of data points $n_1$ of the element data X which belong to the cluster $C_1$ is held in the second register 42. Next, the element data X are input into the adder 39 and added by the adder 39, and the calculation result is held in the first register 41. In other words, the data addition value $SS_1$ which is a q-dimensional vector obtained by adding the element data X belonging to the cluster $C_1$ is held in the first register 41.

Thereafter, the divider 43 divides the data addition value $SS_1$ in the first register 41 by the number of data points $n_1$ in the second register 42 to calculate the cluster centroid $V_1$. The cluster centroid $V_1$ is written into the centroid memory 15 and input into the distance calculation circuit 22. In addition, the data addition value $SS_1$ in the first register 41 and the number of data points $n_1$ in the second register 42 are sent to the evaluation score calculation circuit 18.

The number of data points $n_1$ from the centroid calculation circuit 29 is held in the number-of-data register 64, and the data addition value $SS_1$ is input into the subtractor 52. Thereafter, in the evaluation score calculation circuit 18, the number of data points $n_1$ in the number-of-data register 64 and the data gravity center GG in the GG register 63 are read, and these values are multiplied by each other by the multiplier 51. The difference (q-dimensional vector) between an output value (q-dimensional vector) from the multiplier 51 and the data addition value $SS_1$ from the centroid calculation circuit 29 is obtained by the subtractor 52, and vector components of the difference are added by the integrator 53. Thus, the second index value $SBS_1$ of the cluster $C_1$ at this point in time is calculated. The second index value $SBS_1$ is held in the first SBS register $66_1$.

Here, the cluster centroid $V_i$, the number of data points $n_i$, and the data addition value $SS_i$ satisfy the relationship given by Formula (7) above. Thus, the second index value $SBS_i$ given by Formula (5) above can be modified as given in Formula (8) below. In this way, the second index value $SBS_i$ can be obtained by the above calculation in the evaluation score calculation circuit 18 using the data gravity center GG, the data addition value $SS_i$, and the number of data points $n_i$.

[Formula 4]

$$SBS_i = n_i \times |V_i - GG| \qquad (8)$$
$$= |n_i \times V_i - n_i \times GG|$$
$$= |SS_i - n_i \times GG|$$

Meanwhile, the distance calculation circuit 22 receives the element data X from the delay circuit 21 in synchronization with the cluster centroid $V_1$ from the centroid calculation circuit 29. Each of the cells 22a of the distance calculation circuit 22 calculates the data-to-centroid distance $DXV_1$ between the element data X input into the cell 22a and the cluster centroid $V_1$. Then, if the data-to-centroid distance $DXV_1$ calculated by the cell 22a is shorter than the distance held in the corresponding cell 24a of the distance register section 24 at this point in time, the data contents of the cell 24a are updated with the calculated data-to-centroid distance $DXV_1$, and the cluster ID in the corresponding cell 25a is also updated. At this time, since the cells 24a associated with the element data X hold the maximum value, the data contents of each of the cells 24a and 25a associated with the element data X are updated. Since "1" is given to each of the cells 25a as the designated CID, the cluster ID in each of the cells 25a associated with the element data X is set to "1".

Next, the process for the cluster C2 is performed. The process for the cluster C2 is the same as the process for the cluster $C_1$ described above except that "2" is used as the designated CID. Specifically, among the element data X read from the main memory 14 and input into the CID mask circuit 28, only the element data X corresponding to the cells 25a of the CID register section 25 having a value of "2" are input into the centroid calculation circuit 29. In addition, the comparison flags, the number of which is the same as that of the element data X output from the CID mask circuit 28, are set to "1". In the CID mask circuit 28, since only the data contents of the MID register 37d associated with the element data X which is the cluster centroid $V_2$ are set to "2" as described above, the element data X which is the cluster centroid $V_2$ is input into the centroid calculation circuit 29, and only one comparison flag is set to "1".

Then, the centroid calculation circuit 29 obtains the number of data points $n_2$ for the cluster $C_2$ and the data addition value $SS_2$ for the cluster $C_2$ based on the element data X and the comparison flags output from the CID mask circuit 28, and calculates the cluster centroid $V_2$ based on these values. In the process for the cluster $C_2$ performed for the first time, since only the element data X which is the cluster centroid $V_2$ is input into the centroid calculation circuit 29, the calculated cluster centroid $V_2$ is the same as the one element data X. The cluster centroid $V_2$ obtained by the divider 43 is written into the centroid memory 15 and input into the distance calculation circuit 22. In addition, the data addition value $SS_2$ in the first register 41 and the number of data points $n_2$ in the second register 42 are sent to the evaluation score calculation circuit 18.

The number of data points n 2 from the centroid calculation circuit 29 is held in the number-of-data register 64 separately from the number of data points $n_1$ previously written, and the data addition value $SS_2$ is input into the subtractor 52. Thereafter, the number of data points $n_2$ in the number-of-data register 64 and the data gravity center GG in the GG register 63 are read to calculate the second index value $SBS_2$ in the same manner as the second index value $SBS_1$ described above. The second index value $SBS_2$ is held in the second SBS register $66_2$.

The element data X from the delay circuit 21 are input into the distance calculation circuit 22 in synchronization with the cluster centroid $V_2$ from the centroid calculation circuit 29. Each of the cells 22a of the distance calculation circuit 22 calculates the data-to-centroid distance $DXV_2$ between the element data X input into the cell 22a and the cluster centroid $V_2$. Then, if the calculated data-to-centroid distance $DXV_2$ is shorter than the distance held in the corresponding cell 24a of the distance register section 24, the data contents of the cell 24a are updated with the calculated data-to-centroid distance $DXV_2$, and the cluster ID in the corresponding cell 25a is also updated accordingly. At this time, since "2" is given to each of the cells 25a as the designated CID, the cluster ID in each of the cells 25a is updated with "2". Consequently, among the element data X previously classified into the cluster C1, some element data X closer to the cluster centroid $V_2$ than to the cluster centroid $V_1$ are now classified into the cluster $C_2$ while the data contents of the corresponding cells 24a and 25a are updated.

Thereafter, the data contents of each of the MID registers 37d are updated with the data contents of the corresponding cell 25a of the CID register section 25. In this way, the first classification calculation is terminated.

After the first classification calculation is over, the second classification calculation is performed. In the second classification calculation, the initialization for classification calculation, the process for the cluster $C_1$, and the process for the cluster $C_2$ are performed in this order by the same procedure as that of the first classification calculation. First, in the initialization for classification calculation, the maximum value is written into each of the cells 24a associated with the written element data X, and "1" is written into each of the corresponding cells 25a.

In the subsequent process for the cluster $C_1$, the centroid calculation circuit 29 newly calculates the number of data points $n_1$, a data addition value $SS_1$, and a cluster centroid $V_1$. Then, the cluster centroid $V_1$ held in the centroid memory 15 and the number of data points $n_1$ held in the number-of-data register 64 are updated with the newly calculated values. In addition, the evaluation score calculation circuit 18 calculates a new second index value $SBS_1$ using the new number of data points $n_1$ and the new data addition value $SS_1$, and then the data contents of the first SBS register $66_1$ are updated with the new second index value.

Further, the distance calculation circuit 22 newly calculates a data-to-centroid distance $DXV_1$ between each of the element data X and the new cluster centroid $V_1$. Then, if the new data-to-centroid distance $DXV_1$ calculated in this manner is shorter than the distance in the cell 24a of the distance register section 24, the data contents of the cell 24a are updated with the new data-to-centroid distance $DXV_1$, and the data contents of the cell 25a of the CID register 25 corresponding to the cell 24a are updated with "1" accordingly.

Subsequent to the process for the cluster $C_1$, the process for the cluster $C_2$ is performed in the same manner. The centroid calculation circuit 29 newly calculates a cluster centroid $V_2$, the number of data points $n_2$, and a data addition value $SS_2$. The data contents of the centroid memory 15 and the number-of-data register 64 are updated with the new cluster centroid $V_2$ and the new number of data points $n_2$, respectively. In addition, the evaluation score calculation circuit 18 calculates a new second index value $SBS_2$ using the new data addition value $SS_2$ and the new number of data points $n_2$ calculated by the centroid calculation circuit 29, and the data contents of the second SBS register $66_2$ are updated with the new second index value. Further, the distance calculation circuit 22 newly calculates a data-to-centroid distance $DXV_2$ between each of the element data X and the new cluster centroid $V_2$. If the newly calculated data-to-centroid distance $DXV_2$ is shorter than the distance in the cell 24a of the distance register section 24, the data contents of the cell 24a are updated with the new data-to-centroid distance $DXV_2$, and the data contents of the cell 25a of the CID register section 25 corresponding to the cell 24a are updated with "2". Accordingly, the classification of the element data X into clusters is updated. Thereafter, the data contents of each of the MID registers 37d are updated with the data contents of the corresponding cell 25a of the CID register section 25, and the second classification calculation is thus terminated.

The third and subsequent classification calculation is performed in the same manner to update the cluster centroids $V_1$ and $V_2$, the number of data points $n_1$, the number of data points $n_2$, and the second index values $SBS_1$ and $SBS_2$. In addition, the data contents of each of the cells 24a of the distance register section 24 and the data contents of each of the cells 25a of the CID register section 25 are updated, and thus the element data X are classified into clusters.

As described earlier, the system controller 11 monitors the data contents of the centroid memory 15 every time the classification calculation is performed. The system controller 11 terminates the classification calculation when the data contents of the centroid memory 15 are no longer changed. At the time when the classification calculation is terminated, the cluster centroids $V_1$ and $V_2$ held in centroid memory 15, the number of data points $n_1$ and the number of data points $n_2$ held in the number-of-data register 64, and the second index values $SBS_1$ and $SBS_2$ held in the SBS register unit 66 are based on the converged cluster centroids $V_1$ and $V_2$ which are no longer changed.

After termination of the classification calculation, the evaluation score E(Nc) is calculated. In order to calculate the evaluation score E(Nc), in the evaluation score calculation circuit 18, first, the selector 68 selects the SBS register unit 66 to read the data contents of the SBS registers $66_1$, $66_2$, ... in parallel, and then the parallel adder 54 adds the read data contents of the SBS registers $66_1$, $66_2$, ..., for example. Since the number of clusters Nc is "2" in the current clustering, the second index values $SBS_1$ and $SBS_2$ are practically read from the SBS register unit 66 and added by the parallel adder 54, thereby obtaining the cluster index value SBS which is the sum of the second index values $SBS_i$.

Next, the centroid calculation circuit 29 calculates the compactness index values $SWD_1$ and $SWD_2$ for the clusters $C_1$ and $C_2$, respectively. The within-cluster distances $DXV_i$ are read from the respective cells 24a of the distance register section 24 and input into the centroid calculation circuit 29 via the CID mask circuit 28. At this time, upon input of "1" into each of the cells 28a of the CID mask circuit 28 as the designated CID, only the within-cluster distance $DXV_1$ associated with each of the element data X belonging to the cluster $C_1$ is output to the centroid calculation circuit 29.

In the centroid calculation circuit 29, the adder 39 obtains the number of data points $n_1$ of the element data X belonging to the cluster $C_1$ based on the number of comparison flags having a value of "1", and the obtained value is held in the second register 42. Next, the adder 39 adds the within-cluster distances $DXV_1$ to obtain the first index value $SD_1$, and the obtained value is held in the first register 41. Then, the divider 43 divides the first index value $SD_1$ in the first register 41 by the number of data points $n_1$ in the second register 42 to obtain the compactness index value $SWD_1$. The compactness index value $SWD_1$ is sent to the evaluation score calculation circuit 18 and held in the first SWD register $67_1$.

Subsequently, the centroid calculation circuit 29 calculates the compactness index value $SWD_2$ for the cluster $C_2$ in a similar way, and the calculated value is held in the second SWD register $67_2$. In this case, upon input of "2" into each of the cells 28a of the CID mask circuit 28 as the designated CID, only the within-cluster distance $DXV_2$ associated with each of the element data X belonging to the cluster $C_2$ is input into the centroid calculation circuit 29 from the distance register section 24 via the CID mask circuit 28.

After acquiring the compactness index values $SWD_1$ and $SWD_2$ as described above, in the evaluation score calculation circuit 18, the selector 68 selects the SWD register unit 67 to read the data contents of the SWD registers $67_1$, $67_2$, ... in parallel. Then, the parallel adder 54 adds the read data contents of the SWD registers $67_1$, $67_2$, .... As with the second index value $SBS_i$, the compactness index values $SWD_1$ and $SWD_2$ are practically read from the SWD register unit 67 and added by the parallel adder 54. As a result of the addition by the parallel adder 54, the degree of internal compactness SWD is obtained.

The degree of internal compactness SWD obtained by the parallel adder 54 is input into the multiplier 55, and the multiplier 55 multiplies the degree of internal compactness SWD by the number of clusters Nc (=2) input from the system controller 11. The multiplication result by the multiplier 55 is held in the denominator register 58. The degree of internal compactness SWD is multiplied by the number of clusters Nc in order to normalize the cluster index value SBS by the number of clusters Nc to obtain the normalized degree of external separation (SBS/Nc) which is used to obtain the evaluation score E(Nc) by the subsequent division. Next, the divider 60 divides the data contents of the numerator register 59 by the data contents of the denominator register 58 to calculate the evaluation score E(2) corresponding to the number of clusters Nc of "2".

As described above, the evaluation score calculation circuit 18 calculates the evaluation score E(2) using the calculated values obtained during the calculation process by the clustering computation section 16 for performing clustering. Specifically, the evaluation score calculation circuit 18 calculates the evaluation score E(2) using the second index values $SBS_1$ and $SBS_2$, the second index values $SBS_1$ and $SBS_2$ being obtained using the data addition values $SS_1$ and $SS_2$, the number of data points $n_1$, and the number of data points $n_2$ which are obtained during the calculation process of the cluster centroids $V_1$ and $V_2$. This makes it possible to obtain the evaluation score E(2) efficiently at high speed with low power consumption. The same goes for the evaluation score E(Nc) to be subsequently calculated.

The system controller 11 acquires the evaluation score E(2) which is obtained by the divider 60 in the above manner, and the data contents of each of the cells 25a of the CID register section 25 held at this point in time, that is, the cluster ID for each of the element data X when the number of clusters Nc is "2". The system controller 11 stores the evaluation score E(2) and each cluster ID thus acquired in a storage section (not illustrated).

After the evaluation score E(2) and each cluster ID are acquired, the clustering process for the number of clusters Nc of "3" is performed. In the clustering process for the number of clusters Nc of "3", the initial setting, the classification calculation, and the calculation of the evaluation score are also performed as in the case where the number of clusters Nc is "2".

In the initial setting for the number of clusters Nc of "3", an initial value of a cluster centroid $V_3$ is set together with the cluster centroids $V_1$ and $V_2$ obtained when the number of clusters Nc is "2", for example. The cluster centroid $V_3$ is the element data X corresponding to the maximum within-cluster distance $DXV_i$ among the within-cluster distances $DXV_1$ and $DXV_2$. This initial setting speeds up the convergence of the cluster centroid $V_i$.

The setting of the initial value of the cluster centroid $V_3$ is performed by the same procedure as that performed at the time of setting the initial value of the cluster centroid $V_2$ described above; however, since the within-cluster distances $DXV_1$ and $DXV_2$ are held in the distance register section 24, no calculation of the cluster centroids $V_1$ and $V_2$ and the within-cluster distances $DXV_1$ and $DXV_2$ is required. All the within-cluster distances $DXV_1$ and $DXV_2$ are read from the cells 24a of the distance register section 24, and the maximum detection circuit 27 and the CID mask circuit 28 are used to allow the latch operation of only the MID register 37d of the cell 28a corresponding to the maximum flag of "1" i.e., the maximum within-cluster distance $DXV_i$. The external setting CID of "3" is input in each MID register 37d. Therefore, in response to a clock after the change of the maximum flag as described above, only the data contents of the MID register 37d of the cell 28a corresponding to the maximum flag of "1" are updated with the data contents of the external setting CID ("3").

After the initial setting is performed in the above manner, the first classification calculation is performed. In the first classification calculation, as in the case where the number of clusters Nc is "2", the initialization for classification calculation is performed, then the process for the cluster $C_1$ is performed with the designated CID set to "1", and thereafter the process for the cluster $C_2$ is performed with the designated CID set to "2". After the process for the cluster $C_2$ is over, the process for the cluster $C_3$ is performed with the designated CID set to "3" as in the case of the clusters $C_1$ and $C_2$.

The cluster centroid $V_3$ obtained in the process for the cluster $C_3$ is written into the centroid memory 15, and the number of data points $n_3$ is written into the number-of-data register 64. In addition, the second index value $SBS_3$ obtained from the number of data points $n_3$, the data gravity center GG, and the data addition value $SS_3$ is written into the third SBS register $66_3$. The data gravity center GG may be newly calculated. However, in the embodiments, the data gravity center GG obtained when the number of clusters Nc is "2" and held in the GG register 63 is used without change.

After the first classification calculation is over, the second classification calculation is performed in the same way. The subsequent classification calculation is also performed in the same way. For each classification calculation, the data contents of each of the cells 24a of the distance register section 24 and the data contents of each of the cells 25a of the CID register section 25 are updated, and the classification of the element data X into the clusters $C_i$ is updated. In addition, the cluster centroids $V_1$ to $V_3$ in the centroid memory 15 are updated, and the numbers of data $n_1$ to $n_3$ in the number-of-data register 64 and the second index values $SBS_1$ to $SBS_3$ in the first to third SBS registers $66_1$ to $66_3$ are updated.

When the data contents of the centroid memory 15 (the cluster centroids $V_1$ to $V_3$) are no longer changed, the system controller 11 terminates the classification calculation. Thereafter, the evaluation score calculation circuit 18 calculates the evaluation score E(3). In calculating the evaluation score E(3), the compactness index values $SWD_1$ to $SWD_3$ for the respective clusters $C_1$ to $C_3$ are calculated using the centroid calculation circuit 29.

The system controller 11 acquires the evaluation score E(3) which is obtained in the above manner, and the data contents of each of the cells 25a of the CID register section 25 held at this point in time, that is, the cluster ID for each of the element data X when the number of clusters Nc is "3". The system controller 11 stores the evaluation score E(3) and each cluster ID thus acquired in the storage section.

Subsequently, the clustering process is performed in the same manner while the number of clusters Nc is incremented by 1 to acquire and store, for each of the number of clusters Nc, the evaluation score E(Nc) and the cluster ID for each of the element data X.

If the evaluation score E(Nc+1) acquired this time is smaller than the previous evaluation score E(Nc), the system controller 11 sets the previous number of clusters Nc as the optimum number of clusters. Then, the computation unit 12 is reconstructed in a state where the element data are clustered into clusters with the optimum number of clusters Nc.

For the reconstruction, the system controller 11 initializes each section of the computation unit 12 except for the main memory 14 and the GG register 63, and then writes the cluster IDs, which correspond to the optimum number of clusters Nc and are stored in the storage section, back into the respective cells 25a of the CID register section 25, for example. Thereafter, classification calculation for the clusters $C_1, C_2, \ldots, C_{Nc}$ is performed once, and then the evaluation score E(Nc) is calculated.

As a result, the cluster centroids $V_1$ to $V_{Nc}$ in the centroid memory 15, the within-cluster distances $DXV_1$ to $DXV_{Nc}$ in the cells 24a of the distance register section 24, the cluster IDs in the cells 25a of the CID register section 25, the second index values $SBS_1$ to $SBS_{Nc}$ in the SBS register unit 66, the compactness index values $SWD_1$ to $SWD_{Nc}$ in the SWD register unit 67, and the numbers of data $n_1$ to $n_{Nc}$ in the number-of-data register 64 are reconstructed in their final values obtained when the element data are clustered into clusters with the optimum number of clusters Nc. No change is made, by the classification calculation, to the cluster IDs, which are written into the CID register section 25.

The reconstructing method is not limited to the above method. For example, it is also possible to employ the following method: first, the data contents held in each section of the computation unit 12 after the classification calculation is over are stored in the storage section for each of the number of clusters Nc; and then the data contents corresponding to the optimum number of clusters Nc are written back into each section of the computation unit 12 from the storage section. Alternatively, in the case where the previous number of clusters Nc is set as the optimum number of clusters if the evaluation score E(Nc+1) acquired this time is smaller than the previous evaluation score E(Nc), only the cluster IDs in the CID register section 25 corresponding to the previous number of clusters Nc may be stored in the storage section for reconstruction.

As described above, after the computation unit 12 is reconstructed in the state where the element data are clustered into clusters with the optimum number of clusters Nc, the batch process is terminated.

Figure 15:
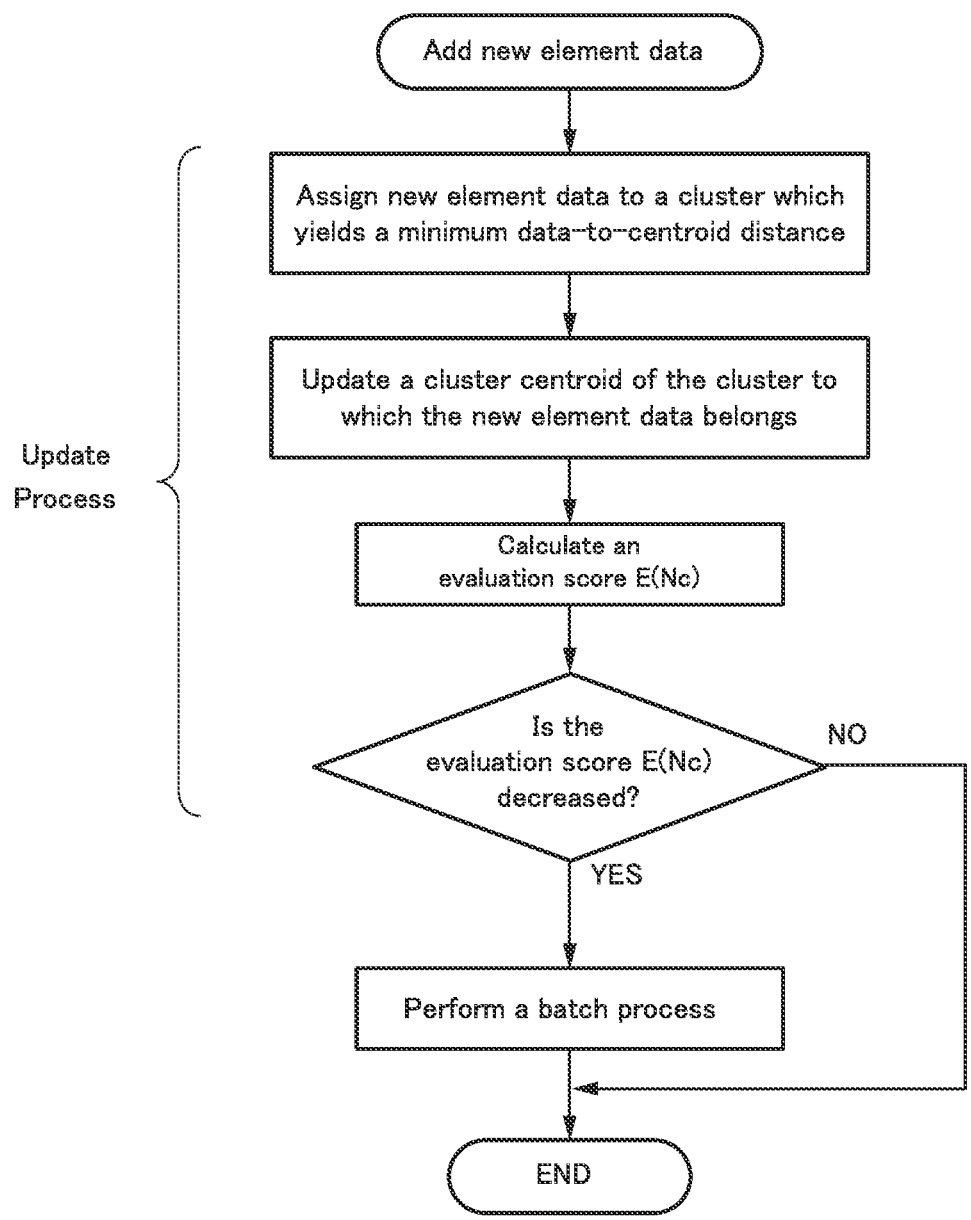
FIG. 15 is a flowchart illustrating a schematic procedure of the update process.

When the new element data Xnew is added after termination of the batch process, the update process is performed. As shown in FIG. 15, in the update process, the new element data Xnew is assigned to the cluster $C_i$ which yields the minimum data-to-centroid distance $DXV_i$ between the new element data Xnew and the cluster centroid $V_i$. In other words, the new element data Xnew is assigned to the cluster $C_i$ which is closest to the new element data Xnew. After this assignment, the cluster centroid $V_i$ of the cluster $C_i$ to which the new element data Xnew is assigned is updated, and then the evaluation score E(Nc) is calculated. Thereafter, based on the evaluation score E(Nc), the validity of the clustering result obtained after the update process is determined.

Hereinbelow, the update process will be described in detail. In the embodiments, the update process is performed in response to the addition of the new element data Xnew. First, the newly added element data Xnew is input into the neighbor search circuit section 17 by the system controller 11, and the cluster centroids $V_i$ are sequentially read from the centroid memory 15 and input into the neighbor search circuit section 17. In the neighbor search circuit section 17, the calculation section 17a sequentially calculates the data-to-centroid distances $DXV_i$ between the new element data Xnew and the cluster centroids $V_i$ which are sequentially input.

If the data-to-centroid distance $DXV_i$ newly obtained by the calculation section 17a is smaller than the data contents held in the short distance register section 17b, the data contents of the short distance register section 17b are updated with the new data-to-centroid distance $DXV_i$. With such an update, the minimum data-to-centroid distance $DXV_i$ between the new element data Xnew and the cluster centroid $V_i$ is eventually held in the short distance register section 17b. In the meantime, the short distance CID register section 17c receives the designated CID indicating the cluster ID corresponding to the cluster centroid $V_i$ input into the neighbor search circuit section 17. Eventually, the cluster ID corresponding to the minimum data-to-centroid distance $DXV_i$ is held in the short distance CID register section 17c. In this manner, the new element data Xnew is assigned to the cluster $C_i$ which yields the minimum data-to-centroid distance $DXV_i$.

Hereinbelow, the cluster ID finally held in the short distance CID register section 17c is denoted by "k" where k takes any one of values 1, 2, . . . Nc.

Next, the evaluation score calculation circuit 18 calculates the cluster centroid $V_k$ after the addition of the new element data Xnew following Formula (9). In Formula (9), the value $V_{kOLD}$ and the value $n_{kOLD}$ indicate the cluster centroid and the number of data for the cluster $C_k$ before the new element data Xnew is added (assigned), respectively. The cluster centroid $V_{kOLD}$ is held in the centroid memory 15, and the number of data points $n_{kOLD}$ is held in the number-of-data register 64.

[Formula 5]
$$V_k = \frac{n_{kOLD} \cdot V_{kOLD} + Xnew}{n_{kOLD} + 1} \quad (9)$$

The number of data points $n_{kOLD}$ read from the number-of-data register 64 of the evaluation score calculation circuit 18 and a fixed value of "1" are input into the adder 56 to obtain a value "$n_{kOLD}+1$", and the obtained value is held in the denominator register 58. In addition, the cluster centroid $V_{kOLD}$ read from the centroid memory 15 and the number of data points $n_{kOLD}$ read from the number-of-data register 64 are input into the multiplier 51 to obtain a value "$n_{kOLD} \times V_{kOLD}$". The value "$n_{kOLD} \times V_{kOLD}$" from the multiplier 51 and the new element data Xnew are input into the adder 57 to obtain the value "$n_{kOLD} \times V_{kOLD} + Xnew$", and the obtained value is held in the numerator register 59. Then, the divider 60 divides the data contents of the numerator register 59 by the data contents of the denominator register 58 to calculate the cluster centroid $V_k$ after assignment of the new element data Xnew. The cluster centroid $V_k$ thus calculated is written into the centroid memory 15 to update the cluster centroid $V_k$ of the cluster $C_k$.

After the cluster centroid $V_k$ is updated, the second index value $SBS_k$ and the compactness index value $SWD_k$ are updated. First, in order to calculate the new second index value $SBS_k$, the cluster centroid $V_k$ is read from the centroid memory 15 and the data gravity center GG is read from the GG register 63, and these values are input into the full adder 45 of the neighbor search circuit section 17. Then, a difference vector (q-dimensional vector) between the cluster centroid $V_k$ and the data gravity center GG is obtained as the output of the adder 61. The difference vector is input into the multiplier 51 of the evaluation score calculation circuit 18 via the selector 50. In addition, the number of data points $n_k$ read from the number-of-data register 64 is input into the multiplier 51. As a result, the difference vector multiplied by the number of data points $n_k$ is obtained. The difference vector multiplied by the number of data points $n_k$ is input into the integrator 53 while passing through the subtractor 52, thereby obtaining the second index value $SBS_k$. The data contents of the k-th SBS register of the SBS register unit 66 are updated with the second index value $SBS_k$ thus calculated.

Subsequently, the compactness index value $SWD_k$ is updated. The new compactness index value $SWD_k$ is calculated by the clustering computation section 16. The new element data Xnew is written into an unused column of the main memory 14, and "k" is written as the cluster ID into the cell 25a of the CID register section 25 associated with the column. In writing the cluster ID, the system controller 11 reads the cluster ID held in the short distance CID register section 17c, and then, while providing the cluster ID to each of the cells 25a of the CID register section 25 as the designated CID, causes only the cell 25a associated with the new element data Xnew to perform the latch operation, for example.

After the cluster ID of the new element data Xnew is written into the CID register section 25, the data contents of the MID registers 37d of the CID mask circuit 28 are updated with the data contents of the corresponding cells 25a of the CID register section 25. Then, the comparator 37e of each of the cells 28a of the CID mask circuit 28 receives the designated CID which designates "k" as the cluster ID. As a result, only the comparison flags from the cells 28a corresponding to the cells 25a having a cluster ID of "k" are set to "1".

Subsequently, all the element data X including the new element data Xnew are read from the main memory 14 and input into the distance calculation circuit 22 via the delay circuit 21. In addition, the cluster centroid $V_k$ read from the centroid memory 15 is input into the distance calculation circuit 22. The element data X is input into the first input terminal of the full adder 32 of each of the cells 22a, and the cluster centroid $V_k$ is input into the second input terminal of the full adder 32. Upon completion of the calculation for q dimensions by the full adder 32, the calculation register 36 of each of the cells 22a holds therein the data-to-centroid distance $DXV_k$ for the corresponding element data X.

After completion of the calculation by the full adder 32 described above, only the cells 24a and 25a, both of which are associated with the comparison flag of "1" (that is, only the cells 25a holding the cluster ID of "k" and the corresponding cells 24a) are allowed to perform the latch operation. Accordingly, at the time when the next clock is generated, the data contents of the cells 24a and 25a associated with the element data Xk assigned to the cluster $C_k$ including the new element data Xnew are updated.

As a result, the cells 24a associated with the element data X belonging to the cluster $C_k$ hold therein the data-to-centroid distance (within-cluster distance) $DXV_k$ which is calculated using the new cluster centroid $V_k$ obtained after assignment of the new element data Xnew. On the other hand, since "k" is given to the CID register section 25 as the designated CID and "k" is written into each of the cells 25a associated with the element data X belonging to the cluster $C_k$, no practical change is made to the data contents. In this manner, the within-cluster distances $DXV_k$ for each element data X belonging to the cluster $C_k$ are updated with the new values corresponding to the new cluster centroid $V_k$.

Then, the within-cluster distances $DXV_i$ are read from the distance register section 24 and input into the centroid calculation circuit 29 via the CID mask circuit 28. The data contents of the MID registers 37d are the same as those of the corresponding cells 25a of the CID register section 25, and designate "k" as the designated CID. Thus, only the within-cluster distances $DXV_k$ are input into the centroid calculation circuit 29. With respect to the comparison flags which are input into the centroid calculation circuit 29, the comparison flags having the same number as the number of the element data X belonging to the cluster $C_k$ are set to "1". Hence, as in the case of the classification calculation, the centroid calculation circuit 29 adds the within-cluster distances $DXV_k$ to obtain the first index value $SD_k$, and calculates the number of data points $n_k$ of the element data X belonging to the cluster $C_k$, thereby obtaining the new compactness index value $SWD_k$ from the first index value $SD_k$ and the number of data points $n_k$. The new compactness index value $SWD_k$ is sent to the evaluation score calculation circuit 18, and the data contents of the k-th SWD register of the SWD register unit 67 are updated with the new compactness index value $SWD_k$.

Thereafter, the evaluation score calculation circuit 18 calculates the evaluation score E(Nc) using the data contents of the SBS register unit 66 and the data contents of the SWD register unit 67. The procedure of calculating the evaluation score E(Nc) at this time is the same as the procedure performed after clustering in the batch process.

As will be understood from the foregoing, in the update process, the cluster centroid $V_k$ of the cluster $C_k$ to which the new element data Xnew is assigned is updated, but no update of the data gravity center GG is made. Typically, the total number of data points in the existing element data X is very large while the shift amount of the data gravity center GG by the addition of, for example, one or several new element data points Xnew is very small. For this reason, the amount of change of the second index value $SBS_i$ having the global-gravity-to-centroid distance $DGV_i$ as a parameter is very small, and therefore influence on the evaluation score E(Nc) caused by not updating the data gravity center GG is quite small. On the other hand, although depending on the number of data points $n_k$, the shift amount of the cluster centroid $V_k$ by the addition of one or several new element data points Xnew is quite large as compared to the shift amount of the data gravity center GG. Thus, the amount of change of the compactness index value $SWD_k$ and the second index value $SBS_k$ increases, and the amount of change of the evaluation score E(Nc) increases in association with the change of these values accordingly.

The system controller 11 acquires the evaluation score E(Nc) calculated in the above manner and, based on the evaluation score E(Nc), determines the validity of the clustering result obtained by the update process. In other words, the system controller 11 determines whether the clustering state is maintained appropriately even after assignment of the new element data Xnew in the update process above.

In the embodiments, the evaluation score E(Nc) which is acquired for the appropriate number of clusters Nc in the batch process performed immediately before the update process is set as a reference evaluation score, and the reference evaluation score is compared with the evaluation score E(Nc) acquired in the update process. In the comparison, if the latter is equal to or larger than the former, the clustering result in the update process is determined to be valid, and the process is terminated, for example. On the other hand, if the latter is smaller than the former, the clustering result in the update process is determined to be not valid, and then the batch process is performed.

After the determination is made that the clustering result in the update process is not valid, the batch process is performed by the same procedure as above. In this case, it is preferable to perform the initial setting using the cluster centroids $V_i$ and the cluster IDs for the element data with the appropriate number of clusters Nc obtained in the previous batch process, or using the cluster IDs for the element data obtained in the update process. With this procedure, it is possible to converge clustering by the k-means algorithm earlier, and reduce the number of calculations and the computation time.

Since the clustering is performed in the above manner, the assignment of the new element data Xnew is efficiently made at high speed. The validity of the clustering result by this assignment is determined based on the evaluation score E(Nc) and, if the clustering result becomes worse, all the element data X including the new element data can be classified into clusters with the optimum number of clusters Nc in the batch process, which makes it possible to keep the high accuracy of clustering. If this procedure is applied to an automatic recognition device having a learning function, for example, it is possible to implement high-speed and real-time recognition (classification) by the update process, and to achieve high-accuracy learning by the batch process depending on the situation.

The method of determining whether the clustering state is maintained appropriately based on the evaluation score E(Nc) obtained in the update process is not limited to the above method. However, it is preferable to set the evaluation score E(Nc) obtained prior to the update process as a reference evaluation score, and compare the reference evaluation score with the evaluation score E(Nc) obtained in the update process as described above. Alternatively, it is also possible to use, as a reference evaluation score, an evaluation score for evaluating the result of clustering performed immediately before the current update process irrespective of whether such clustering is performed in the batch process or in the update process. Still alternatively, if the amount of decrease in the evaluation score caused by the update process falls within a specified range, the clustering result can be determined to be valid, and if the amount of decrease in the evaluation score is out of the specified range, the clustering result can be determined to be not valid. Here, the specified range is 10 to 15 percent or less of the evaluation score obtained before the update process, or equal to or smaller than a predetermined value, for example. Still alternatively, if the amount of decrease in the evaluation score caused by the update process falls within the specified range, it is also possible to request an operator to select whether to perform the batch process, and determine whether to perform the batch process in response to an input from the operator.

In the above embodiments, although the update process is performed every time one new element data point is added, the update process may be performed in response to the addition of a certain number of multiple new element data points. Alternatively, upon addition of one or more new element data points, a determination may be made as to whether to perform the update process or to perform the batch process directly without performing the update process, depending on whether a predetermined condition is satisfied. For example, the batch process may be performed directly without performing the update process if the number of newly added element data points is equal to or larger than a preset value or if a ratio of the number of newly added element data points to the number of clustered element data points is equal to or larger than a certain value.

In the above embodiments, the processes for the clusters in the classification calculation of the batch process may be performed in random order. In addition, although the cluster centroid is written into the centroid memory every time the cluster centroid is acquired in the classification calculation, the cluster centroid may be written into the centroid memory after the cluster centroid converges. In this case, such convergence can be determined by monitoring the cluster centroid calculated by the centroid calculation circuit. Likewise, the second index value may be calculated and written into the SBS register unit after the cluster centroid converges. The number of data points may also be written into the number-of-data register in the same way.

The clustering using the clustering device 10 described above will be verified for the following three cases (1) to (3): (1) new element data points Xnew are located inside one of two existing clusters (FIG. 16); (2) the new element data points Xnew are located away from the two existing clusters and distances to the two existing clusters are different (FIG. 17); and (3) the new element data points Xnew are located near one of the two existing clusters (FIG. 18). In any of these cases, 50 element data points X are assigned to each existing cluster in the batch process, and 10 element data points Xnew are newly added and subjected to the update process together with the existing data points. The evaluation score E(Nc) is calculated by Formula (1) above.

In the case (1) where the new element data points Xnew are located inside one of the two existing clusters, each of the new element data points Xnew is assigned, by the update process, to one of the clusters within which these new element data points are located. In Table 1, the column "Batch Process (Before Addition)" indicates the evaluation score E(Nc) for each of the numbers of clusters Nc into which all the element data points X are clustered before addition of the new element data points Xnew. The column "After Update Process" in Table 1 indicates the evaluation score E(2) obtained when the update process is performed after addition of the new element data points Xnew. For reference, the column "Batch Process (After Addition)" in Table 1 indicates the evaluation score E(Nc) for each of the numbers of clusters Nc into which all the element data points X including the new element data points Xnew are clustered.

TABLE 1

| | Evaluation Score E (Nc) | | |
|---|---|---|---|
| Number of Clusters Nc | Batch Process (Before Addition) | After Update Process | Batch Process (After Addition) |
| 2 | 217.5 | 233.0 | 233.0 |
| 3 | 131.7 | — | 148.0 |
| 4 | 95.1 | | 101.9 |
| 5 | 85.9 | | 87.4 |

In the case (2) where the new element data points Xnew are located away from the two existing clusters and the distances to the two existing clusters are different, each of the new element data points Xnew is assigned, by the update process, to closer one of the two existing clusters. In Table 2, the column "Batch Process (Before Addition)" indicates the evaluation score E(Nc) for each of the numbers of clusters Nc into which all the element data points X are clustered before addition of the new element data points Xnew, and the column "After Update Process" indicates the evaluation score E(2) obtained when the update process is performed after addition of the new element data points Xnew. In this case, since the evaluation score E(2) is largely decreased by the update process, the batch process is performed after the validity determination. The column "Batch Process (After Addition)" in Table 2 indicates the evaluation score E(Nc) for each of the numbers of clusters Nc in that case.

TABLE 2

| | Evaluation Score E (Nc) | | |
|---|---|---|---|
| Number of Clusters Nc | Batch Process (Before Addition) | After Update Process | Batch Process (After Addition) |
| 2 | 485.3 | 114.1 | 114.1 |
| 3 | 309.0 | — | 537.2 |
| 4 | 227.3 | | 397.7 |
| 5 | 185.2 | | 292.8 |

In the case (3) where the new element data points Xnew are located near one of the two existing clusters, each new element data point Xnew is assigned, by the update process, to the one of the two existing clusters that is located closer to each new element data point than the other of the clusters. In Table 3, the column "Batch Process (Before Addition)" indicates the evaluation score E(Nc) for each of the numbers of clusters Nc into which all the element data points X are clustered before addition of the new element data points Xnew, and the column "After Update Process" indicates the evaluation score E(2) obtained when the update process is performed after the addition of the new element data points Xnew. In this case, the evaluation score E(2) is decreased by the update process by around 10 percent. For reference, the column "Batch Process (After Addition)" in Table 3 indicates the evaluation score E(Nc) for each of the numbers of clusters Nc obtained when the batch process is performed after the update process.

TABLE 3

| | Evaluation Score E (Nc) | | |
|---|---|---|---|
| Number of Clusters Nc | Batch Process (Before Addition) | After Update Process | Batch Process (After Addition) |
| 2 | 485.3 | 435.9 | 435.9 |
| 3 | 309.0 | — | 266.4 |
| 4 | 227.3 | | 218.2 |
| 5 | 185.2 | | 150.8 |

The formula for calculating the evaluation score is not limited to the above. The degree of internal compactness described above means that the smaller the degree of internal compactness, the higher the similarity between data points within each cluster is, and the more compact the data points within each cluster are. On the other hand, the degree of external separation described above means that the greater the degree of external separation, the lower the similarity between the clusters is, and the more separate the clusters are. Therefore, the evaluation score has only to monotonically increase or decrease as the degree of internal compactness decreases or the degree of external separation increases. Any formulae for evaluation scores showing such a behavior can be employed using, as variables, the degree of internal compactness and the degree of external separation.

For example, instead of the cluster index value SBS (second sum) given by Formula (1), the sum of minimum values of between-cluster distances $(d(V_i, V_j))$ for each cluster is used as the cluster index value SBS (second sum) as given by Formula (10). The between-cluster distance $(d(V_i, V_j))$ is a distance between one cluster $C_i$ and another cluster $C_j$. In this case, the minimum value of the between-cluster distance $(d(V_i, V_j))$ between one cluster $C_i$ and another cluster $C_j$ defines the second index value $SBS_i$.

[Formula 6]

$$SBS = \sum_{i=1}^{Nc} \min_{i \neq j} d(V_i, V_j) \quad (10)$$

Instead of Manhattan distance, Euclidean distance, Minkowski distance, point symmetry distance and other such distance may be used to calculate the data-to-centroid distance (within-cluster distance), the global-gravity-to-centroid distance, and the between-cluster distance. Alternatively, a square of such distance may also be used.

In the embodiments, the normalized compactness index value $SWD_i$ is obtained by dividing the first index value $SD_i$ by a first value. The first value is the number of data points $n_i$ within each cluster. However, the first value is not limited to this, and can be defined by any other value based on the number of data points $n_i$ within the cluster $C_i$. Examples of the first value may include a power of the number of data points $n_i$ within the cluster $C_i$ (such as $n_i^2$, $n_i^3$, $n_i^{1/2}$, $n_i^{-2}$), the number of data points $n_i$ multiplied by a constant, the number of data points $n_i$ plus or minus a constant, or a predefined function of the number of data points $n_i$ and the number of clusters Nc, denoted by $F(n_i, Nc)$, such as "$F(n_i, Nc)=n_i-Nc$" and "$F(n_i, Nc)=k \cdot n_i-Nc$" where k is a constant.

The normalized degree of external separation (SBS/Nc) is obtained by dividing the cluster index value SBS by a second value. The second value is the number of clusters Nc. However, the second value is not limited to this, and can be defined by any other value based on the number of clusters Nc. As with the first value, examples of the second value other than the number of clusters Nc may include a power of the number of clusters Nc, the number of clusters Nc multiplied by a constant, or the number of clusters Nc plus or minus a constant.

Another degree of external separation depending on the total number of data points Nn may be used to define an evaluation score denoted by E(Nn, Nc). One example of such a degree of external separation may be defined by dividing the value "SBS/Nc" by the total number of data points Nn (=SBS/(Nc×Nn)). The evaluation score E(Nn, Nc) is useful for evaluating the clustering state in each of the numbers of clusters Nc unless the element data points increase. However, when the total number of data points Nn increases, the evaluation score E(Nn, Nc) decreases with an increase in the element data points as compared to the evaluation score obtained before the total number of data points Nn increases even if the clustering state is desirable. For this reason, when the total number of element data points Nn is dynamically changed by, for example, adding the element data points, or when the evaluation scores obtained before and after the element data points increase are compared with each other as in the update process described above, it is preferable that the evaluation score should not depend on the total number of data points Nn like the evaluation score E(Nc) given by Formula (1) and the evaluation score E(Nc) using the cluster index value SBS given by Formula (10).

The method of evaluating the clustering state (classification result) using the above evaluation score E(Nc) and the method of calculating the evaluation score E(Nc) using the calculated values that are obtained during the calculation process for the clustering performed by the clustering computation section are not only applicable to the update process after addition of one or more new element data points, but also to the batch process after addition of one or more new element data points, for example.

In the above embodiments, the cluster centroid is used as a base point of the within-cluster distance. Such a base point is referred to as a first representative point. The cluster centroid is also used as a base point of each cluster for measuring the global-gravity-to-centroid distance which is an index of a distance between clusters and as a base point of each cluster for measuring the between-cluster distance. Such a base point is referred to as a second representative point. However, the first representative point and the second representative point are not limited to the cluster centroid.

For example, the first representative point and the second representative point may be an element data point which is closest to the cluster centroid within each cluster. Moreover, since the second representative point is a base point for measuring a degree of separation (distance) between the clusters or between a cluster and a reference point to be described later, the second representative point may be an element data point within each cluster which is closest to or farthest from the adjacent cluster or the reference point. Alternatively, the first representative point and the second representative point may be a point or element data point within each cluster determined based on another criteria, or an arbitrary point or element data point within each cluster.

Although the data gravity center is defined as the reference point in the above embodiments, any other point or element data point may be set as the reference point. Instead of the data gravity center as described above, the reference point may be a point or element data point determined based on another criteria, such as an element data point that is closest to the data gravity center, the second representative point in one of the clusters, an externally designated point or element data point, an element data point stored at an externally designated address in a main memory, or an element data point which is input first.

An inverse of Formula (1) may be used as an evaluation score E(Nc). In this case, the optimum number of clusters Nc is determined by choosing the evaluation score E(Nc) that takes a minimum or a local minimum. Instead of the above-described formula for evaluation scores defined by the ratio between the degree of internal compactness and the degree of external separation, the following formulae can also be employed, such as evaluation scores E(Nc) defined by weighted sum of one of the degree of internal compactness and the degree of external separation plus an inverse of the other, or evaluation scores E(Nc) defined by weighted sum of one of the degree of internal compactness and the degree of external separation plus negative of the other. In the following formulae, Wa and Wb denote weighting constants where Wa and Wb≠0.

$$E(Nc) = Wb \cdot \left(\frac{SBS}{Nc}\right) + Wa \cdot \left(\frac{1}{SWD}\right) \quad \text{[Formula 7]}$$

$$E(Nc) = Wb \cdot \left(\frac{Nc}{SBS}\right) + Wa \cdot SWD$$

$$E(Nc) = Wb \cdot \left(\frac{SBS}{Nc}\right) - Wa \cdot SWD$$

$$E(Nc) = Wa \cdot SWD - Wb \cdot \left(\frac{SBS}{Nc}\right)$$

In the above embodiments, the k-means algorithm is used for clustering. However, the clustering algorithm is not limited to the k-means algorithm. Hard clustering for assigning each element data point to one cluster is employed in the embodiments disclosed herein. Examples of such hard clustering include "k-means++" algorithm, spectral clustering, single linkage method, and Ward's method.

REFERENCE SIGNS LIST 10 clustering device
11 system controller
14 main memory
15 centroid memory
16 clustering computation section
17 neighbor search circuit section 18 evaluation score calculation circuit
18a logic section
18b evaluation register section
25 CID register section
29 centroid calculation circuit
PD1 to PD6 power domain

The invention claimed is:

1. A clustering device for classifying multiple element data, comprising:
a circuit comprising:
a data storage section configured to store the multiple element data;
an evaluation score calculation section configured to calculate an evaluation score or evaluation scores for evaluating a classification result;
a batch process section configured to (i) classify the multiple element data into clusters with an optimum number of clusters, based on the evaluation scores respectively obtained for different number of clusters by assigning each of the multiple element data to one of the clusters, and (ii) cause switching between enabling and disabling a latch operation of at least one pair of cells respectively provided in two register sections, whereby the circuit controls the latch operation of the at least one pair of the cells concurrently;
an update process section configured to assign newly added element data to a cluster that is closest to the newly added element data among the clusters into which the multiple element data are classified by the batch process section; and
a determination section configured to determine validity of a classification result after assigning the newly added element data to the cluster, by comparing the evaluation score obtained by assigning the newly added element data to the cluster by the update process section and the evaluation score before assigning the newly added element data to the cluster.

2. The clustering device according to claim 1, wherein upon determining that the classification result is not valid, the determination section is configured to cause the batch process section to perform classification on all element data including the newly added element data.

3. The clustering device according to claim 1, wherein the data storage section includes a non-volatile memory.

4. The clustering device according to claim 1, wherein the batch process section includes:
one of the two register sections configured to hold clustering information on classification of the multiple element data; and
a calculation circuit configured to perform data computation,
the evaluation score calculation section includes:
an evaluation register section configured to hold data for calculating the evaluation scores obtained by classifying the multiple element data by the batch process section; and
a logic section configured to calculate the evaluation scores,
the clustering device includes multiple power domains which are independently provided with power supply,
at least the data storage section, the calculation circuit, the update process section, and the logic section are provided in different power domains of the multiple power domains, and
the one of the two register sections and the evaluation register section are provided in another power domain of the multiple power domains.

5. The clustering device according claim 1, wherein the evaluation score calculation section is configured to:
calculate a degree of internal compactness that is a first sum of values, each being defined by normalizing a first index value by a first value that is based on a number of element data within each cluster, the first index value indicating a degree of dispersion of element data within each cluster;
calculate a degree of external separation defined by normalizing a second sum of second index values for each cluster by a second value that is based on the number of clusters, each of the second index values indicating an index of a distance between the clusters; and
calculate the evaluation score or each of the evaluation scores according to a predetermined formula defined by the degree of internal compactness and the degree of external separation which are variables.

6. The clustering device according to claim 5, wherein when classifying the multiple element data, the batch process section is configured to:
calculate a data addition value obtained by adding element data within each cluster, and the number of element data within each cluster; and
calculate a cluster centroid for each cluster from the data addition value and the number of element data, and
the evaluation score calculation section is configured to:
acquire, for each cluster, the data addition value and the number of element data calculated by the batch process section;
calculate the second index value for each cluster using the data addition value and the number of element data which are acquired;
hold the number of element data and the second index value for each cluster; and
calculate the evaluation score or each of the evaluation scores using the second index value which is held.

7. The clustering device according to claim 6, wherein the evaluation score calculation section is configured to:
calculate a cluster centroid of the cluster after assignment of the newly added element data to the cluster, using the newly added element data, the cluster centroid of the cluster and the number of element data within the cluster before assignment of the newly added element data to the cluster;
update the second index value of the cluster, using the cluster centroid of the cluster after assignment of the newly added element data to the cluster; and
calculate, using the second index value which is updated, the evaluation score after assignment of the newly added element data to the cluster.

8. A clustering device, comprising:
a clustering section configured to (i) classify multiple element data into clusters and (ii) cause switching between enabling and disabling a latch operation of at least one pair of cells respectively provided in two register sections, whereby the latch operation of the at least one pair of the cells are controlled concurrently; and
an evaluation score calculation section configured to:
using calculated values obtained during a calculation process by the clustering section for classification of the multiple element data,
calculate a degree of internal compactness that is a first sum of values, each being defined by normalizing a first index value by a first value that is based on a number of element data within each cluster, the first index value indicating a degree of dispersion of element data within each cluster;

calculate a degree of external separation defined by normalizing a second sum of second index values for each cluster by a second value that is based on a number of clusters, each of the second index values indicating an index of a distance between the clusters; and calculate an evaluation score for evaluating a classification result by the clustering section according to a predetermined formula defined by the degree of internal compactness and the degree of external separation which are variables.

9. The clustering device according to claim 8, wherein in response to addition of one or more new element data, the clustering section is configured to assign at least the one or more new element data to one of the clusters.

10. The clustering device according to claim 8, wherein the clustering section includes a centroid calculation circuit configured to calculate a cluster centroid for each cluster when classifying the multiple element data into clusters, the centroid calculation circuit includes:
a data adder configured to add element data within each cluster to obtain a data addition value;
a quantity calculator configured to calculate the number of element data within each cluster from a number of signals corresponding to element data within each cluster;
a first register configured to hold the data addition value obtained by the data adder;
a second register configured to hold the number of element data obtained by the quantity calculator; and
a divider configured to divide the data addition value held in the first register by the number of element data held in the second register to calculate the cluster centroid, wherein the evaluation score calculation section is configured to:
calculate, for each cluster, the second index value using the data addition value acquired by the first register and the number of element data acquired by the second register; and
calculate the evaluation score using the second index value for each cluster.

11. A clustering method, comprising:
a batch process step of obtaining an optimum number of clusters from evaluation scores obtained by classifying all element data into clusters while changing a number of clusters to evaluate classification results for each of the number of clusters, obtaining a classification result of classifying all element data into clusters with the optimum number of clusters, and causing switching between enabling and disabling a latch operation of at least one pair of cells respectively provided in two register sections, whereby the latch operation of the at least one pair of the cells are controlled concurrently;

an update process step of assigning, upon addition of new element data after the batch process step, the new element data to one of existing clusters, and calculating an evaluation score for evaluating a classification result after assigning the new element data to the one of the existing clusters; and a determining step of determining validity of the classification result after assigning the newly added element data to the cluster in the update process step, by comparing the evaluation score obtained by assigning the newly added element data to the cluster in the update process step and the evaluation score before assigning the newly added element data to the cluster.

12. The clustering method according to claim 11, further comprising:
upon determining in the determining step that the classification result is not valid, performing the batch process step on all element data including the new element data.

13. The clustering method according to claim 11, wherein calculating the evaluation score or each of the evaluation scores comprises:
calculating a degree of internal compactness that is a first sum of values, each being defined by normalizing a first index value by a first value that is based on a number of element data within each cluster, the first index value indicating a degree of dispersion of element data within each cluster;

calculating a degree of external separation defined by normalizing a second sum of second index values for each cluster by a second value that is based on the number of clusters, each of the second index values indicating an index of a distance between the clusters; and calculating the evaluation score or each of the evaluation scores according to a predetermined formula defined by the degree of internal compactness and the degree of external separation which are variables.

14. A clustering device for classifying multiple element data, comprising:
a circuit comprising:
a data storage section configured to store the multiple element data;
an evaluation score calculation section configured to calculate an evaluation score or evaluation scores for evaluating a classification result;
a batch process section configured to (i) classify the multiple element data into clusters with an optimum number of clusters, based on the evaluation scores respectively obtained for different number of clusters by assigning each of the multiple element data to one of the clusters, and (ii) cause switching between enabling and disabling a latch operation of at least one pair of cells respectively provided in two register sections, whereby the circuit controls the latch operation of the at least one pair of the cells concurrently;
an update process section configured to assign newly added element data to a cluster that is closest to the newly added element data among the clusters into which the multiple element data are classified by the batch process section; and
a determination section configured to determine validity of a classification result after assigning the newly added element data to the cluster, based on the evaluation score obtained by assigning the newly added element data to the cluster by the update process section, wherein;
upon determining that the classification result is not valid, the determination section is configured to cause the batch process section to perform classification on all element data including the newly added element data.

15. A clustering device for classifying multiple element data, comprising:
a circuit comprising:
a data storage section configured to store the multiple element data;

an evaluation score calculation section configured to calculate an evaluation score or evaluation scores for evaluating a classification result;

a batch process section configured to (i) classify the multiple element data into clusters with an optimum number of clusters, based on the evaluation scores respectively obtained for different number of clusters by assigning each of the multiple element data to one of the clusters, and (ii) cause switching between enabling and disabling a latch operation of at least one pair of cells respectively provided in two register sections, whereby the circuit controls the latch operation of the at least one pair of the cells concurrently;

an update process section configured to assign newly added element data to a cluster that is closest to the newly added element data among the clusters into which the multiple element data are classified by the batch process section; and a determination section configured to determine validity of a classification result after assigning the newly added element data to the cluster, based on the evaluation score obtained by assigning the newly added element data to the cluster by the update process section, wherein the batch process section includes:
  one of the two register sections configured to hold clustering information on classification of the multiple element data; and
  a calculation circuit configured to perform data computation, the evaluation score calculation section includes:
  an evaluation register section configured to hold data for calculating the evaluation scores obtained by classifying the multiple element data by the batch process section; and
  a logic section configured to calculate the evaluation scores, the clustering device includes multiple power domains which are independently provided with power supply, at least the data storage section, the calculation circuit, the update process section, and the logic section are provided in different power domains of the multiple power domains, and the one of the two register sections and the evaluation register section are provided in another power domain of the multiple power domains.

16. A clustering device for classifying multiple element data, comprising:
a circuit comprising:
a data storage section configured to store the multiple element data;
an evaluation score calculation section configured to calculate an evaluation score or evaluation scores for evaluating a classification result;
a batch process section configured to (i) classify the multiple element data into clusters with an optimum number of clusters, based on the evaluation scores respectively obtained for different number of clusters by assigning each of the multiple element data to one of the clusters, and (ii) cause switching between enabling and disabling a latch operation of at least one pair of cells respectively provided in two register sections, whereby the circuit controls the latch operation of the at least one pair of the cells concurrently;
an update process section configured to assign newly added element data to a cluster that is closest to the newly added element data among the clusters into which the multiple element data are classified by the batch process section; and
a determination section configured to determine validity of a classification result after assigning the newly added element data to the cluster, based on the evaluation score obtained by assigning the newly added element data to the cluster by the update process section, wherein the evaluation score calculation section is configured to:
  calculate a degree of internal compactness that is a first sum of values, each being defined by normalizing a first index value by a first value that is based on a number of element data within each cluster, the first index value indicating a degree of dispersion of element data within each cluster;
  calculate a degree of external separation defined by normalizing a second sum of second index values for each cluster by a second value that is based on the number of clusters, each of the second index values indicating an index of a distance between the clusters; and
calculate the evaluation score or each of the evaluation scores according to a predetermined formula defined by the degree of internal compactness and the degree of external separation which are variables.

17. A clustering method, comprising:
a batch process step of obtaining an optimum number of clusters from evaluation scores obtained by classifying all element data into clusters while changing a number of clusters to evaluate classification results for each of the number of clusters, obtaining a classification result of classifying all element data into clusters with the optimum number of clusters, and causing switching between enabling and disabling a latch operation of at least one pair of cells respectively provided in two register sections, whereby the circuit controls the latch operation of the at least one pair of the cells concurrently;
an update process step of assigning, upon addition of new element data after the batch process step, the new element data to one of existing clusters, and calculating an evaluation score for evaluating a classification result after assigning the new element data to the one of the existing clusters; and
a determining step of determining validity of the classification result in the update process step, based on the evaluation score calculated in the update process step, wherein
upon determining in the determining step that the classification result is not valid, performing the batch process step on all element data including the new element data.

18. A clustering method, comprising:
a batch process step of obtaining an optimum number of clusters from evaluation scores obtained by classifying all element data into clusters while changing a number of clusters to evaluate classification results for each of the number of clusters, obtaining a classification result of classifying all element data into clusters with the optimum number of clusters, and causing switching between enabling and disabling a latch operation of at least one pair of cells respectively provided in two register sections, whereby the circuit controls the latch operation of the at least one pair of the cells concurrently;
an update process step of assigning, upon addition of new element data after the batch process step, the new element data to one of existing clusters, and calculating an evaluation score for evaluating a classification result after assigning the new element data to the one of the existing clusters; and a determining step of determining validity of the classification result in the update process step, based on the evaluation score calculated in the update process step, wherein calculating the evaluation score or each of the evaluation scores comprises:

calculating a degree of internal compactness that is a first sum of values, each being defined by normalizing a first index value by a first value that is based on a number of element data within each cluster, the first index value indicating a degree of dispersion of element data within each cluster;

calculating a degree of external separation defined by normalizing a second sum of second index values for each cluster by a second value that is based on the number of clusters, each of the second index values indicating an index of a distance between the clusters; and calculating the evaluation score or each of the evaluation scores according to a predetermined formula defined by the degree of internal compactness and the degree of external separation which are variables.

\* \* \* \* \*